US009556970B2

(12) United States Patent
Mastrovito

(10) Patent No.: US 9,556,970 B2
(45) Date of Patent: Jan. 31, 2017

(54) CASCADE TRIM FOR CONTROL VALVE

(71) Applicant: CONTROL COMPONENTS, INC., Rancho Santa Margarita, CA (US)

(72) Inventor: Marco Mastrovito, Gioia Del Colle (IT)

(73) Assignee: Control Components, Inc., Rancho Santa Margarita, CA (US)

( * ) Notice: Subject to any disclaimer, the term of this patent is extended or adjusted under 35 U.S.C. 154(b) by 401 days.

(21) Appl. No.: 14/333,313

(22) Filed: Jul. 16, 2014

(65) Prior Publication Data
US 2015/0020903 A1 Jan. 22, 2015

Related U.S. Application Data

(60) Provisional application No. 61/856,502, filed on Jul. 19, 2013.

(51) Int. Cl.
F16K 1/54 (2006.01)
F16K 47/04 (2006.01)
F16K 47/08 (2006.01)

(52) U.S. Cl.
CPC ............ F16K 47/08 (2013.01); F16K 1/54 (2013.01); F16K 47/04 (2013.01); Y10T 137/86791 (2015.04)

(58) Field of Classification Search
CPC ............ F16K 47/08; F16K 1/54; F16K 47/04; Y10T 137/86759; Y10T 137/86767; Y10T 137/86775; Y10T 137/86791; Y10T 137/86799; Y10T 137/86807; Y10T 137/86783; Y10T 137/86558; Y10T 137/86509; Y10T 137/86517; Y10T 137/86718; Y10T 137/8671; Y10T 137/87539; Y10T 137/87949

USPC .......................................................... 251/127
See application file for complete search history.

(56) References Cited

U.S. PATENT DOCUMENTS

| 352,273 | A | | 9/1886 | Solano | |
|---|---|---|---|---|---|
| 1,645,601 | A | * | 10/1927 | Lee | F16K 47/04 251/122 |
| 2,764,181 | A | * | 9/1956 | Richolt | F16K 41/04 137/625.37 |
| 3,078,877 | A | | 2/1963 | Leeper | |

(Continued)

OTHER PUBLICATIONS

International Search Report and Written Opinion for International Application No. PCT/US2014/047469; Nov. 12, 2014; 6 Pages.

Primary Examiner — Craig Schneider
Assistant Examiner — Frederick D Soski
(74) Attorney, Agent, or Firm — Stetina Brunda Garred and Brucker; Mark B. Garred

(57) ABSTRACT

A cascade type trim for integration into control valve and having a valve stem and a valve cage which cooperate with each other to define a plurality of fluid passageway columns, each of which extend between a valve inlet and a valve outlet. Each fluid passageway column is collectively defined by a plurality of stem passageways and a plurality of cage passageways. The stem and cage passageways are brought in and out of alignment as a result of axial movement of the stem relative to the cage. In a first position, a first fluid passageway is open, while a second fluid passageway remains closed. In a second position, both the first and second fluid passageways are open, and yet in a third position, the first fluid passageway is closed and the second fluid passageway is open.

20 Claims, 21 Drawing Sheets

(56) References Cited

U.S. PATENT DOCUMENTS

| | | | | |
|---|---|---|---|---|
| 3,252,480 | A * | 5/1966 | Odendahl | F16K 47/04 137/625.3 |
| 3,469,591 | A * | 9/1969 | Odendahl | F16K 47/06 137/14 |
| 3,485,474 | A * | 12/1969 | Baumann | F16K 1/54 251/121 |
| 3,637,188 | A * | 1/1972 | Ung | F16K 47/04 137/637.2 |
| 3,715,098 | A * | 2/1973 | Baumann | F16K 47/04 251/121 |
| 3,730,479 | A * | 5/1973 | Baumann | F16K 47/04 137/625.3 |
| 3,791,413 | A * | 2/1974 | Muller | F16K 47/04 137/625.3 |
| 3,908,698 | A * | 9/1975 | Baumann | F16K 1/54 137/625.3 |
| 3,920,044 | A * | 11/1975 | Gruner | F16K 47/04 137/625.3 |
| 3,971,411 | A | 7/1976 | Baumann | |
| 4,044,992 | A * | 8/1977 | Jukoff | F16K 47/06 138/43 |
| 4,363,464 | A * | 12/1982 | Spils | F16K 47/04 251/121 |
| 4,479,509 | A * | 10/1984 | Dear | F16K 47/02 137/375 |
| 4,504,040 | A * | 3/1985 | Spils | F16K 47/04 251/121 |
| 4,549,718 | A * | 10/1985 | Seger | F16K 47/04 251/121 |
| 4,632,359 | A * | 12/1986 | Tooth | F16K 47/02 138/43 |
| 4,634,095 | A * | 1/1987 | Taylor | F16K 47/04 137/625.37 |
| 4,858,515 | A * | 8/1989 | Karlberg | B62D 5/07 137/101 |
| RE33,053 | E * | 9/1989 | Seger | F16K 47/04 137/625.3 |
| 4,967,783 | A * | 11/1990 | Loos | F04D 15/0011 137/115.05 |
| 5,018,703 | A * | 5/1991 | Goode | F16K 47/08 137/625.3 |
| 5,497,801 | A * | 3/1996 | Kusunose | F04D 15/0011 137/115.04 |
| 5,615,708 | A * | 4/1997 | Barron | F16K 47/04 137/625.3 |
| 5,765,814 | A | 6/1998 | Dvorak et al. | |
| 5,803,119 | A | 9/1998 | Steinke | |
| 6,047,735 | A * | 4/2000 | Casey | F01L 9/02 137/625.38 |
| 6,076,552 | A * | 6/2000 | Takahashi | F15B 13/0402 137/625.3 |
| 6,293,514 | B1 * | 9/2001 | Pechoux | F16K 1/52 137/625.3 |
| 6,382,233 | B1 * | 5/2002 | Yandle, II | F16K 13/06 102/275.1 |
| 7,455,115 | B2 * | 11/2008 | Loretz | E21B 43/12 138/43 |
| 7,690,400 | B2 * | 4/2010 | Haines | F16K 47/08 137/625.3 |
| 8,042,572 | B2 * | 10/2011 | Winnacker | E21B 21/08 137/625.3 |
| 8,393,355 | B2 * | 3/2013 | Samy | F16K 3/267 137/625.3 |
| 8,464,756 | B2 * | 6/2013 | Navale | F16K 11/0708 137/625.67 |
| 8,851,119 | B2 * | 10/2014 | Fujiwara | F16K 11/07 137/625.66 |
| 8,998,169 | B2 * | 4/2015 | Kaegi | F15C 1/16 137/808 |
| 2004/0050433 | A1 * | 3/2004 | Nawaz | F16K 47/04 137/625.39 |
| 2004/0238050 | A1 * | 12/2004 | Hamblin | F16K 47/04 137/625.37 |
| 2006/0130911 | A1 * | 6/2006 | Caprera | F16K 47/04 137/614.11 |
| 2007/0040136 | A1 * | 2/2007 | Caprera | F16K 1/482 251/122 |
| 2009/0183790 | A1 | 7/2009 | Moore | |
| 2010/0252768 | A1 | 10/2010 | Caprera | |
| 2013/0048889 | A1 * | 2/2013 | Fujiwara | F16K 31/124 251/29 |
| 2013/0193360 | A1 * | 8/2013 | Zhou | F16K 5/04 251/309 |
| 2013/0276924 | A1 * | 10/2013 | Venkitasubramony | F16K 47/04 137/625.37 |

\* cited by examiner

| Δp (bar) | Kv | Trim velocity (m/s) | Clearance Velocity (m/s) |
|---|---|---|---|
| 8.18 | 14.01 | 33.5 | 6.6 |
| 117.40 | 3.541 | 49.7 | 23.9 |
| 154.71 | 0.3237 | 44.1 | 27.4 |
| 174.97 | 0.2994 | 46.1 | 28.6 |
| 224.99 | 0.2424 | 48.0 | 29.8 |

CASCADE TRIM FOR CONTROL VALVE

CROSS-REFERENCE TO RELATED APPLICATIONS

This application claims the benefit of U.S. Provisional Application Ser. No. 61/856,502, filed Jul. 19, 2013, the contents of which are expressly incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to flow control devices and, more particularly, to a cascade trim control valve which includes a uniquely configured valve stem and corresponding valve cage formed with complimentary flow passages which are selectively brought in and out of alignment with each other to vary the fluid control properties of the control valve.

2. Description of the Related Art

There is currently known in the prior art a type of control valve commonly referred to as a pintle valve wherein the short extension of a needle-valve tip is used to facilitate the control of fluid through the valve. An exemplary pintle-type fluid flow control device or control valve is described with particularity in Applicant's U.S. Pat. No. 5,803,119 entitled FLUID FLOW CONTROL DEVICE issued Sep. 8, 1998.

In one embodiment of the control valve described in the '119 Patent, a cylindrical plug is moveable axially within a complimentary cylinder. The plug includes a fluid flow path extending axially therein. As the plug is moved axially relative to the cylinder, the area of path entry available for fluid flow and the length of the fluid flow path is varied. As a result, as the plug moves further out of the cylinder, a corresponding increase in fluid flow is obtained in the control valve.

Another species of conventional fluid control valves generally includes a cage and a valve stem reciprocally moveable within the cage. The cage is typically formed from a plurality of stacked disks, which when stacked, form a plurality of tortuous flow passages between an inner surface and an outer surface. When the valve stem is in a closed position, the stem typically covers all of the passages in the cage, thereby preventing fluid from flowing through the cage. The incremental movement of the stem from the closed position toward an open position incrementally exposes the fluid passages in the cage, thereby allowing fluid to flow therethrough.

One particular concern with such valves is cavitation, which may be triggered in response to certain flow conditions. Cavitation creates damage to the structure of the valve. Another drawback with conventional disk-stack type valves is that they tend to be ineffective when used with dirty fluids, i.e., fluids having debris/particulate in the fluid. As the fluid flows through the valve, the debris may clog the passageways within the cage, thereby altering the fluid control properties of the cage.

The flow control device or control valve constructed in accordance with the present invention represents an improvement over the control valve described in the '119 Patent, and the conventional disk-stack type valves, by virtue of its inclusion of more intricate and complex flow passages which are formed in both the valve stem and the surrounding cylinder (i.e., the cage). The increased intricacy/complexity of the flow passages within the control valve of the present invention provides for a better flow range/rangeability therethrough. These, as well as other features and advantages of the present invention, will be described in more detail below.

BRIEF SUMMARY OF THE INVENTION

In accordance with the present invention, there is provided a cascade trim for use in a fluid control valve, wherein the cascade trim includes a valve stem and a valve cage which cooperate with each other to define a plurality of fluid passageway columns, each of which extend between a valve inlet and a valve outlet. Each fluid passageway column is collectively defined by a plurality of stem passageways and a plurality of cage passageways. The stem and cage passageways are brought in and out of alignment with each other as a result of axial movement of the stem relative to the cage. When the stem is moved into a first position, a first fluid passageway is open, while a second fluid passageway remains closed. When the stem is moved into a second position, both the first and second fluid passageways are open. When the stem is moved into a third position, the first fluid passageway is closed and the second fluid passageway is open. The first and second fluid passageways exhibit different fluid flow control characteristics, and thus, the stem may be selectively positioned in accordance with desired flow control parameters.

The first fluid passageway column may be comprised of a twenty "stage" fluid passageway traversing through both the valve stem and the cage. The second fluid passageway column may be comprised of a twelve "stage" fluid passageway, also traversing through both the valve stem and the cage.

The trim may include a pair of first fluid passageway columns arranged in diametrically opposed relation to each other. Likewise, the trim may include a pair of second fluid passageway columns arranged in diametrically opposed relation to each other.

The trim may include a third fluid passageway column in addition to the first and second fluid passageway columns.

The valve cage may include a discharge chamber and a valve seat defining a valve outlet, wherein the valve seat is slightly elevated above a bottom floor of the discharge chamber to allow for collection of debris/particulate in the fluid as the fluid passes through the trim.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
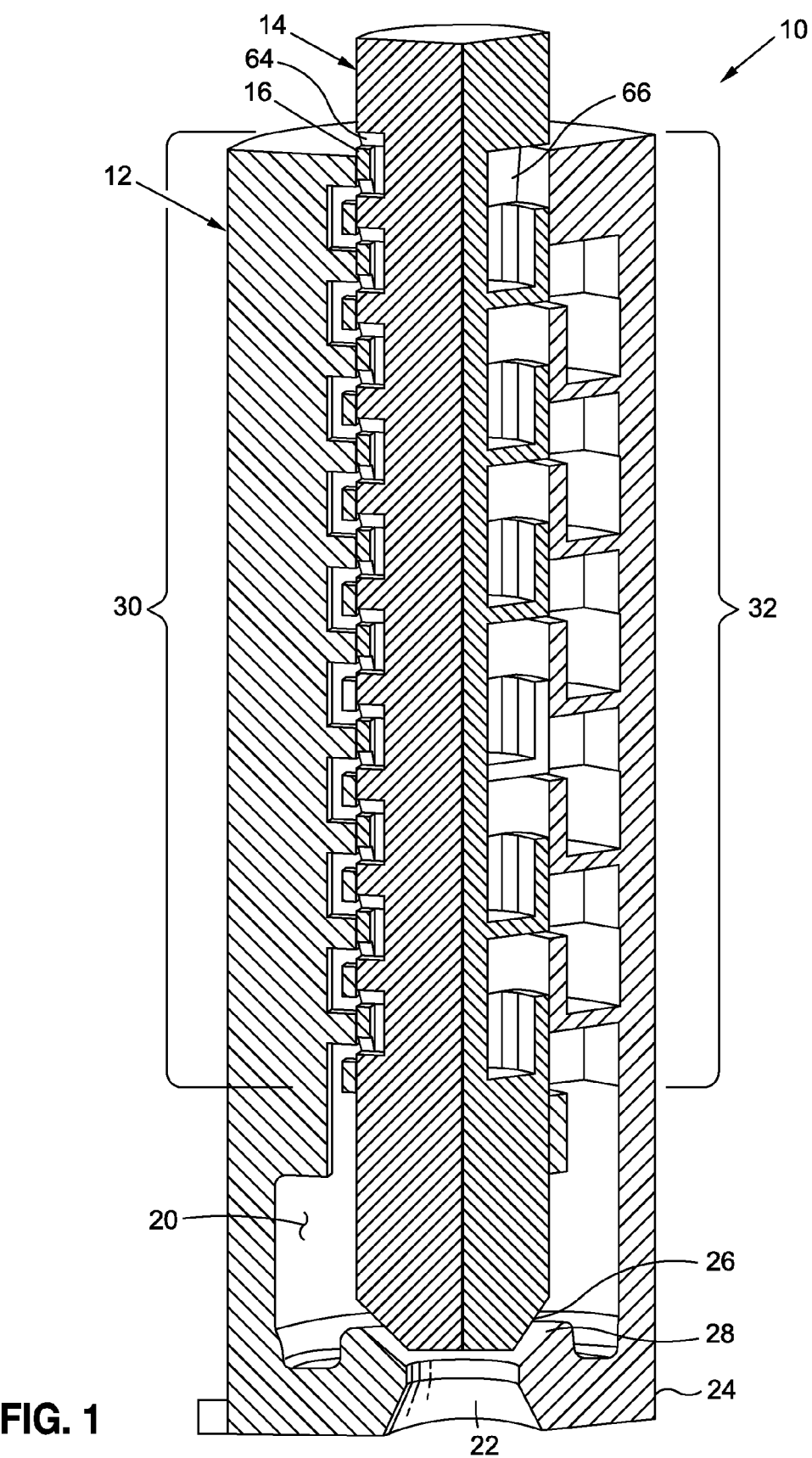
FIG. 1 is an upper perspective sectional view of an exemplary cage and valve stem of a cascade trim which may be integrated into a fluid control valve constructed in accordance with a first embodiment of the present invention.

Referring now to the drawings wherein the showings are for purposes of illustrating a preferred embodiment of the present invention only, and not for purposes of limiting the same, FIG. 1 is a partial cross sectional perspective view of a fluid control valve including a cascade trim 10. The cascade trim 10 comprises a cage 12 and a valve stem 14 disposed within the cage 12 and reciprocally, axially movable relative thereto. Though not shown, the trim 10 will typically reside within a hollow, interior gallery or chamber defined by a housing of the control valve including the same. When viewed from the perspective shown in FIG. 1, the cage 12 includes an inlet 16 formed at the top end portion 18 (see FIG. 2) thereof, and a discharge chamber 20 having an outlet 22 formed at the bottom end portion 24 of the cage 12. The inlet 16 will fluidly communicate with an inlet passage defined by the control valve housing, with the outlet 22 fluidly communicating with an outlet passage defined by the control valve housing. The stem 14 includes a beveled end portion 26 which interfaces with a valve seat 28 formed in the cage 12 to close the cascade trim 10, and hence the control valve including the same. In the exemplary embodiment, the valve seat 28 is formed at the bottom of the cage 12, although it is also contemplated that in other embodiments, the valve seat 28 may be formed at the top of the valve cage 12. The stem 14 is actuated axially to lift the beveled end portion 26 off the complimentary seat 28 to open the cascade trim 10, and hence the control valve including the same. Though also not shown, the movement of the stem 14 is preferably facilitated by an elongate shank which is attached to and extends axially from the top end thereof opposite the beveled end portion 26, the shank itself being cooperatively engaged to a suitable actuator. A more comprehensive discussion of an exemplary control valve structure which may accommodate the trim 10 is included in Applicant's co-pending U.S. application Ser. No. 13/827, 462 entitled MULTI-STAGE FLUID FLOW CONTROL DEVICE filed Mar. 14, 2013, the entirety of which is incorporated herein by reference.

Figure 2:
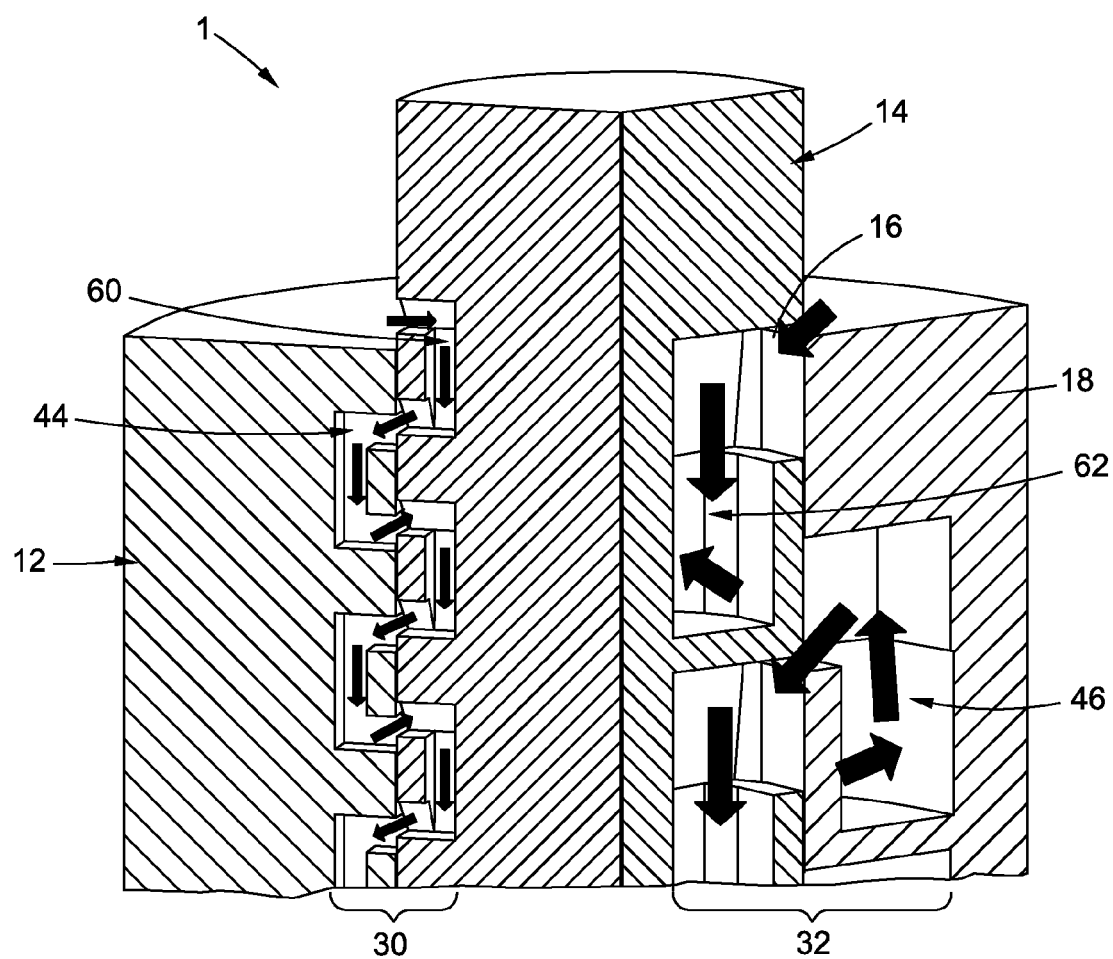
FIG. 2 is an enlarged upper perspective sectional view of an upper portion of the cage and valve stem depicted in FIG. 1 with the arrows representing fluid flow through the cage and valve stem.

As will be described in more detail below, the cage 12 and stem 14 are each manufactured to include a series of passageways formed therein, such that certain ones of the cage passageways are brought into fluid communication with the corresponding ones of the stem passageways in response to axial movement of the stem 14 relative to the cage 12 to create or constitute one or more fluid passageway columns through the cascade trim 10. The stem 14 and cage 12 may be configured to define multiple fluid passageway columns, each of which corresponds to different axial positions of the stem 14 relative to the valve cage 12. Each fluid passageway column may exhibit different fluid control properties, and as such, the stem 14 may be throttled to a position corresponding to the desired fluid passageway column depending on the desired fluid control parameters. For instance, FIGS. 1 and 2 show partial cross sectional views of an exemplary stem 14 and cage 12, wherein FIG. 2 is an enlarged view of the top portion of the stem 14 and cage 12 shown in FIG. 1. A first fluid passageway column 30 is depicted on the left side of the cascade trim 10 and a second fluid passageway column 32 is depicted on the right side of the cascade trim 10. The first and second passageways columns 30, 32 shown in FIGS. 1 and 2 are both defined by complimentary sets of openings in the cage 12 and stem 14 which have been brought into alignment with each other due to the particular placement of the stem 14 relative to the cage 12. As FIGS. 1 and 2 are only partial sectional views of the cascade trim 10, it is contemplated that the complete cascade trim 10 will include minor images of the first and second passageway columns 30, 32 in diametrically opposed relation to the columns 30, 32 depicted in FIGS. 1 and 2.

Figure 3:
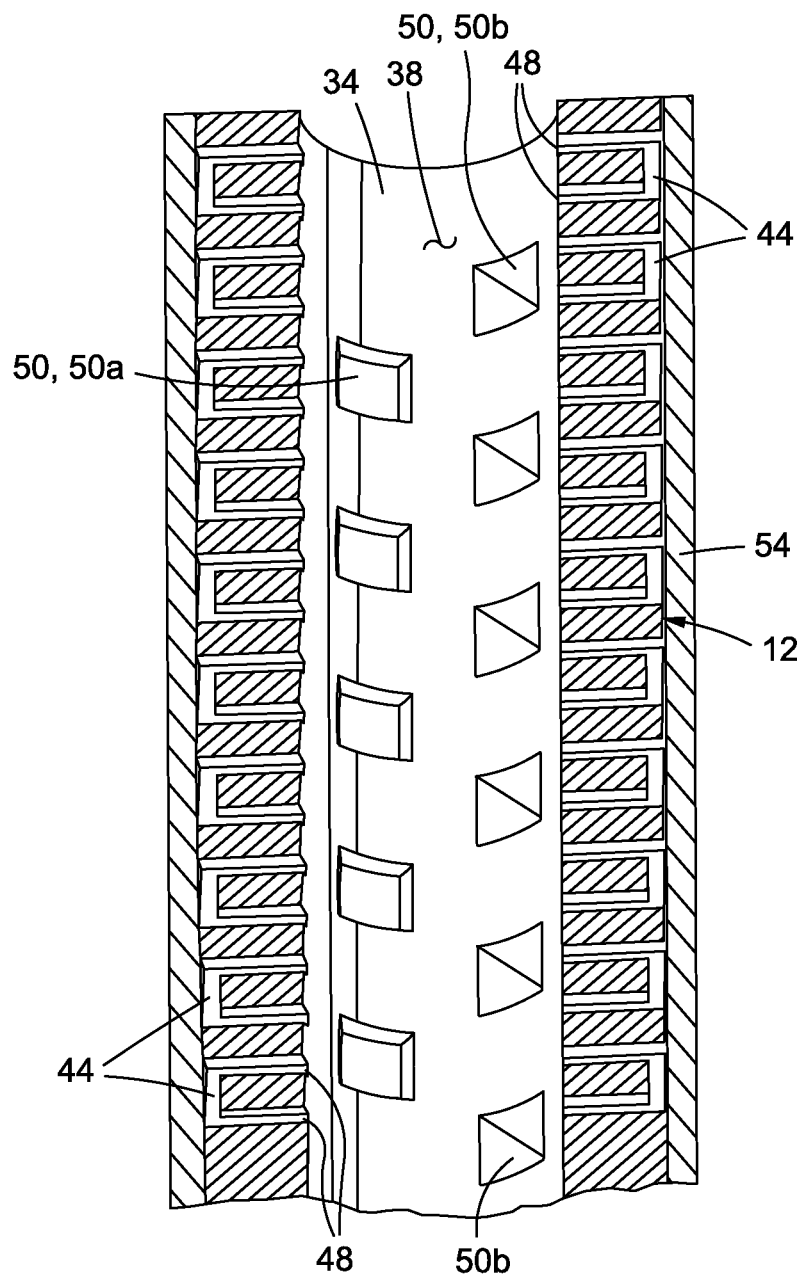
FIG. 3 is a partial sectional view of the cage shown in FIGS. 1 and 2 disposed within an outer sleeve.
Figure 4:
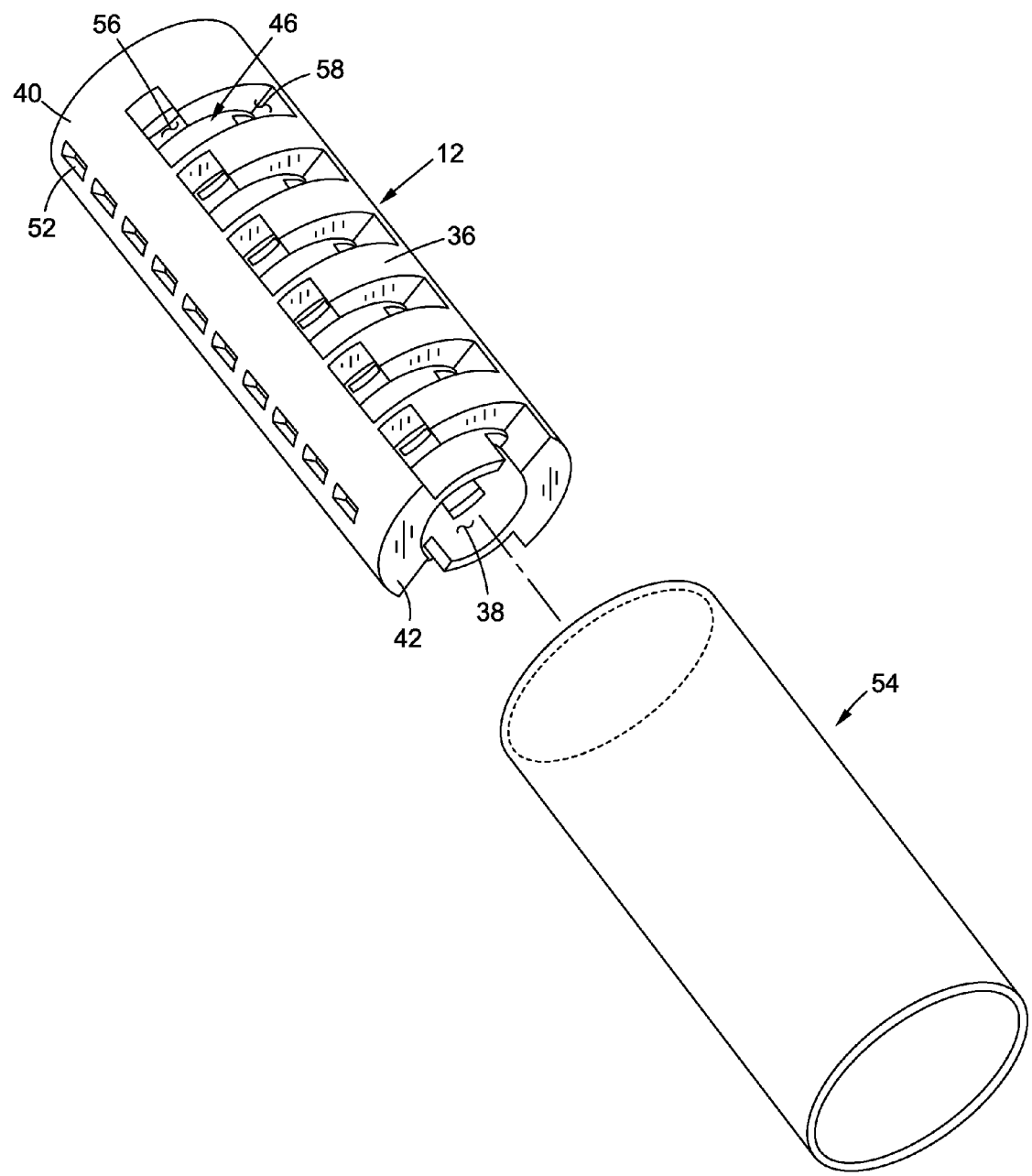
FIG. 4 is an exploded perspective view of the cage and sleeve shown in FIG. 3.

Referring now specifically to FIGS. 3 and 4, there is depicted an exemplary embodiment of the cage 12, wherein FIG. 3 shows a cross sectional view of the cage 12 and FIG. 4 depicts a perspective view of the cage 12. The cage 12 has a generally cylindrical configuration and includes an inner surface 34 as well as an outer surface 36, with a central bore 38 extending axially through the cage 12 from a first end portion 40 to an opposing second end portion 42 thereof. The cage 12 includes a plurality of passageways formed therein, wherein the passageways define respective portions of the first and second fluid passageway columns 30, 32. The cage passageways used in forming the first fluid passageway column 30 will be referred to herein as the first cage passageways 44, while the cage passageways used in forming the second fluid passageway column 32 will be referred to herein as the second cage passageways 46.

In the embodiment depicted in FIG. 3, the first cage passageways 44 are depicted in the cross-sectional plane as small, generally U-shaped channels having openings 48 in communication with the central bore 38. The first cage passageways 44 are arranged in two diametrically opposed arrays.

The second cage passageways 46 are associated with the large, generally quadrangular-shaped openings 50 arranged in two-parallel arrays of six openings. Although only a cross section is shown in FIG. 3, the complete cage 12 includes another set of second passageway openings 50 arranged in diametrically opposed relation to the first set depicted in FIG. 3.

FIG. 4 shows a perspective view of the cage 12, including the outer contour thereof. The first cage passageways 44 are associated with the ten openings 52 aligned in an axial array along the outer surface 36 of the cage 12. The openings 52 may be covered by an outer sleeve 54, which will be described in more detail below.

The second cage passageways 46 each include an axial channel portion 56 and an arcuate, circumferentially extending channel portion 58 in fluid communication with the axial channel portion 56. Each arcuate channel portion 58 corresponds to a respective one of the openings 50a included in a first array (see FIG. 3), while each axial channel portion 56 corresponds to a respective one of the openings 50b in a second array (see FIG. 3). Thus, the axial and arcuate channel portions 56, 58 of each second cage passageway 46 collectively establish fluid communication between an opening in the first array 50a and an opening in the second array 50b.

The cage 12 may be formed by two cage halves which collectively define the cage 12 described herein. The valve stem 14 includes a plurality of stem passageways which are complimentary to the cage passageways 44, 46 described above for use in forming the first and second fluid passageway columns 30, 32. The stem passageways used in forming the first fluid passageway column 30 will be referred to herein as the first stem passageways 60 (see FIG. 2), while the stem passageways used in forming the second fluid passageway column 32 will be referred to herein as the second stem passageways 62 (see FIG. 2). The first stem passageways 60 are in communication with the smaller first stem openings 64 (see FIG. 1) arranged in an axial array on the outer surface of the stem 14. Each first stem passageway 60 is a generally U-shaped passageway that extends between a pair of first stem openings 64. The second stem passageways 62 are in communication with the larger second stem openings 66 (see FIG. 1). Each second stem passageway 62 extends from one of the second stem openings 66 to another second stem opening 66 which is circumferentially spaced therefrom. Each second stem passageway 62 is preferably configured to include an axial channel portion and an arcuate channel portion, similar to the configuration of the second cage passageways 46 discussed above.

It is understood that the one embodiment of the stem 14 includes diametrically opposed pairs of first and second stem passageways 60, 62, which are complimentary to the diametrically opposed pairs of first and second cage passageways 44, 46 formed in the cage 12.

According to one embodiment, the openings 64, 66 formed in the stem 14 each preferably have a generally trapezoidal shape for enhancing rangeability and controllability of the cascade trim 10, while the openings 48, 50 in the cage 12 each preferable have a generally rectangular shape.

The cage 12 and stem 14 are preferably fabricated through the use of a direct metal laser sintering (DMLS) process as is described with particularity in Applicant's co-pending U.S. application Ser. No. 12/018,088 entitled DIRECT METAL LASER SINTERED FLOW CONTROL ELEMENT filed Jan. 22, 2008, the entirety of which is also incorporated herein by reference. The use of the DMLS process to facilitate the fabrication of the cage 12 and stem 14 allows for the creation of more intricate and complex flow passages therein.

Considering the wide range of design variability that is achievable as a result of using the DMLS process to facilitate the fabrication of the stem 14 and cage 12, those of ordinary skill in the art will recognize that the particular configurations thereof as described above is exemplary only, and may be varied depending on the desired performance characteristics of any valve fabricated to include the cage 12 and stem 14.

Furthermore, although DMLS is the preferred method of fabricating the cage 12 and stem 14, it is additionally contemplated that other manufacturing techniques known by those skilled in the art may also be used without departing from the spirit and scope of the present invention. For instance, the cage 12 and/or stem 14 may be manufactured by milling or casting.

Referring now to FIG. 4, there is shown an outer sleeve 54 which may be disposed about the cage 12 to close the first cage passageways 44, as shown in FIG. 3. The outer sleeve 54 is generally cylindrical in nature and defines an inner diameter that is substantially equal to, although may be slightly larger than, the outer diameter of the cage 12 so as to tightly fit about the cage 12 for mitigating fluid leakage at the intersection of the cage 12 and the outer sleeve 54.

Figure 5:
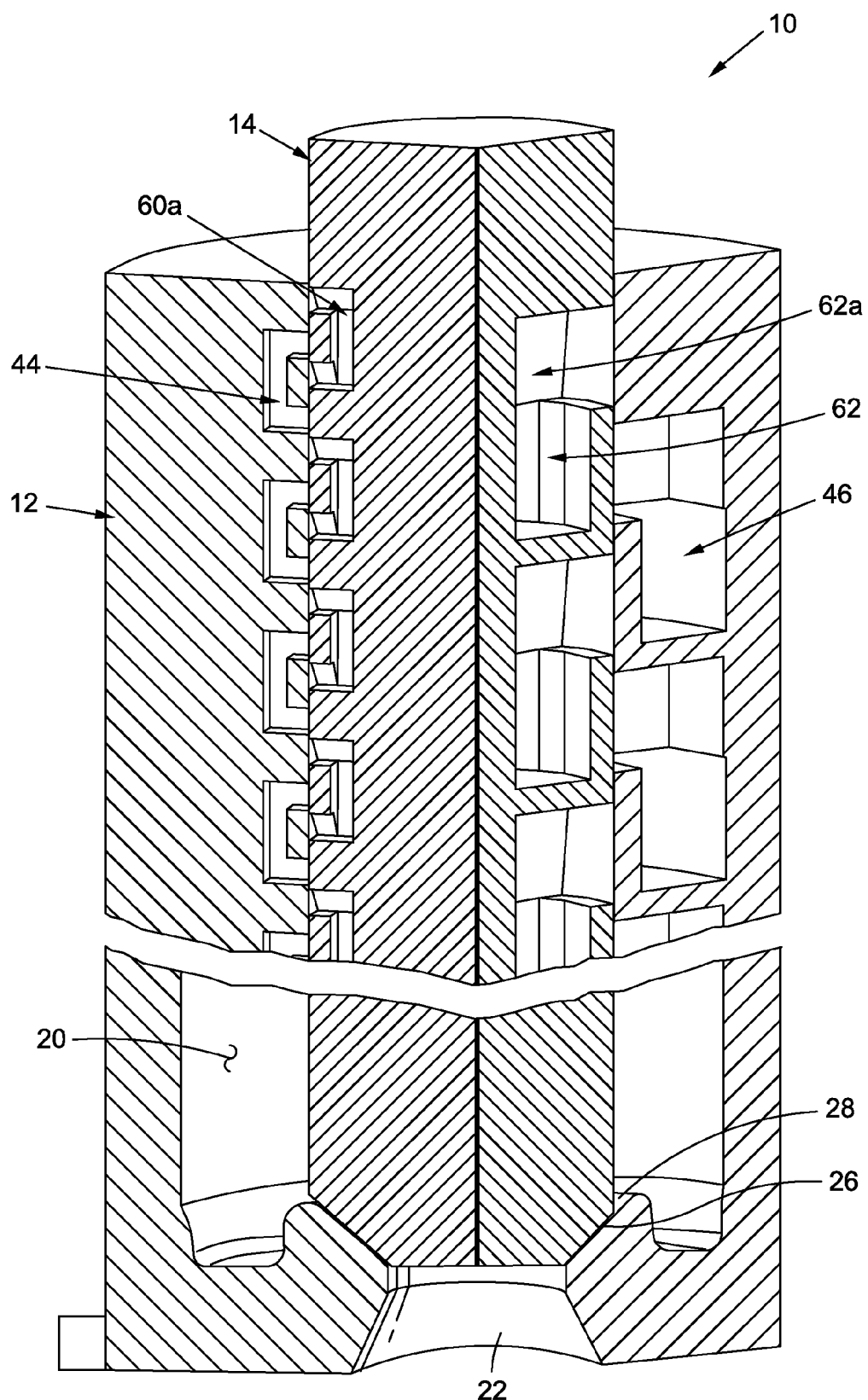
FIG. 5 is a perspective sectional view of the valve stem of the control valve in a closed position relative to the cage.

With the basic structural features of the stem 14 and cage 12 being described above, the following discussion pertains to operation of the control valve, and in particular the cascade trim 10 thereof. Referring now to FIG. 5, the trim 10 of the control valve is shown in its closed position. The beveled end portion 26 of the stem 14 is engaged with the valve seat 28 to close the valve outlet 22. Furthermore, the first cage passageways 44 are out of alignment with the first stem passageways 60, and the second cage passageways 46 are out of alignment with the second stem passageways 62, resulting in closure or division of the first and second fluid passageway columns 30, 32. Furthermore, the uppermost first and second stem passageways 60a, 62a remain within the cage 12, thereby preventing fluid from entering either of the first and second stem passageways 60a, 62a.

Figure 6:
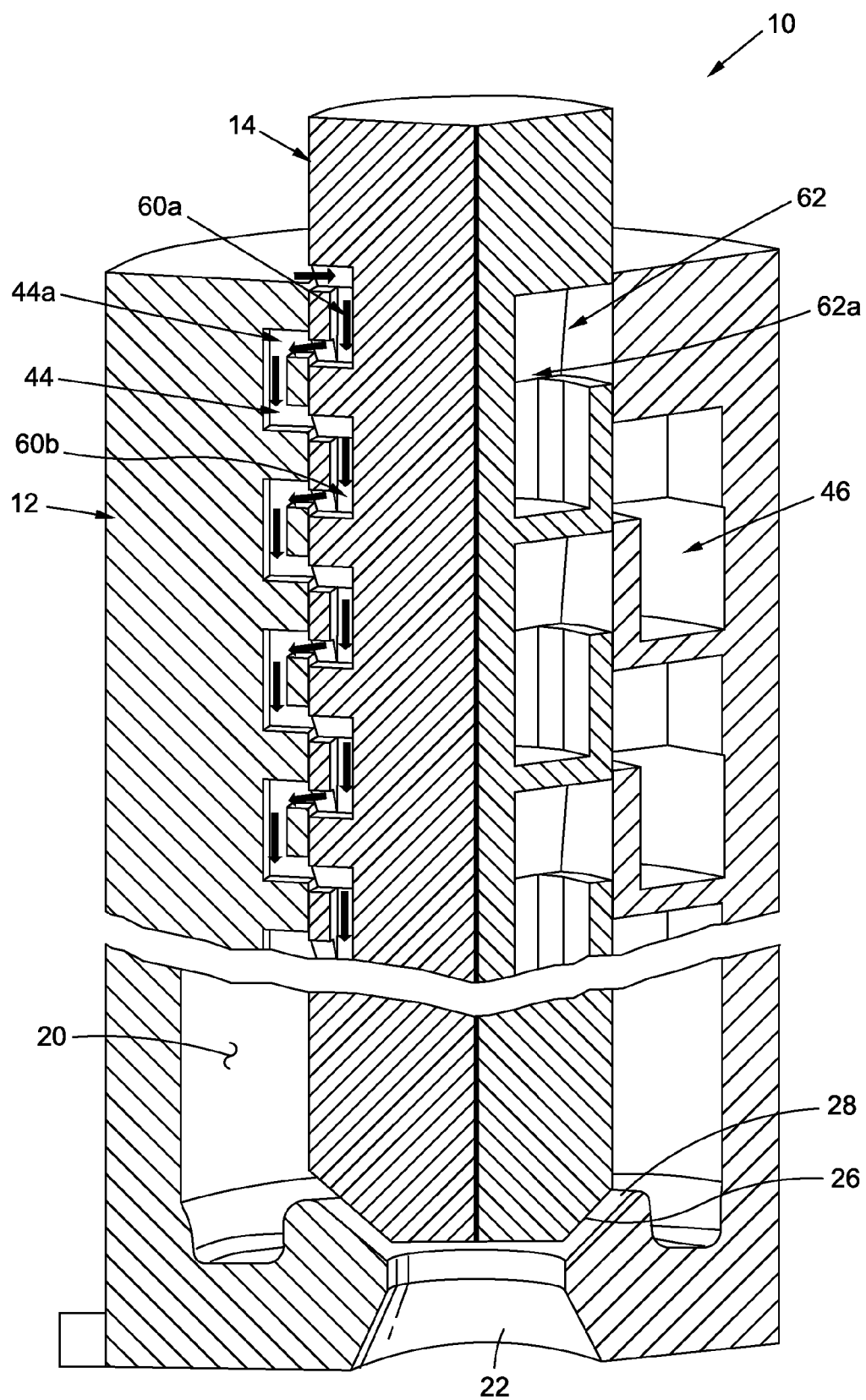
FIG. 6 is a perspective sectional view of the valve stem of the control valve as moved to a first position relative to the cage to bring a first set of cage and stem passages into partial alignment with each other to define a first fluid passageway column through the control valve.

FIG. 6 shows the trim 10 of the control valve in a first open position. The valve stem 14 has been moved slightly from the closed position depicted in FIGS. 5. In particular, the beveled end portion 26 of the stem 14 has been lifted from the valve seat 28 to allow for fluid passage through the valve outlet 22. Furthermore, the axial movement of the stem 14 causes a portion of the uppermost first stem passageway 60a to rise out of the cage 12, thereby exposing a portion of the uppermost first stem passageway 60a to fluid at the inlet 16. In addition, the first stem passageways 60 are brought into partial alignment with the first cage passageways 44 to create/constitute the first fluid passageway column 30 (see FIG. 1) through the trim 10. As such, fluid may flow from the inlet 16 to the outlet 22 via the first fluid passageway column 30.

FIG. 6 shows arrows representative of the fluid flow through that portion of the first passageway column 30. As can be seen, the fluid flows through a very small opening created between the cage 12 and the stem 14, and into each uppermost first stem passageway 60a. The fluid flows through the uppermost first stem passageway 60a, which is a generally U-shaped passageway, and then into the corresponding uppermost first cage passageway 44a. Once again, the fluid must pass through a very small opening between the stem 14 and the cage 12 to flow therebetween. Once inside the uppermost first cage passageway 44a, the fluid flows through the generally U-shaped passage, and into the next, corresponding first stem passageway 60b. The fluid continues to flow through alternating first stem passageways 60 and first cage passageways 44 until the fluid enters the discharge chamber 20 at the bottom of the cage 12. The discharge chamber 20 is specifically configured and adapted to collect debris or particulate in the fluid flowing through the trim 10. Such accumulation is facilitated by the pressure drop in the fluid attributable to its flow through each of the two first passageway columns 30 preferably included in the trim 10. The fluid passes through the discharge chamber 20 and exits the trim 10 through the outlet 22.

In the exemplary cage 12 and stem 14 depicted in FIG. 1, the fluid passes through twenty "stages" as the fluid flows through the entirety of each of the first fluid passageway columns 30. Each "stage" is represented by a respective one of the first stem passageways 60 or the first cage passageways 44. In other words, the first "stage" includes the uppermost first stem passageway 60a, the second "stage" includes the uppermost first cage passageway 44a, the third "stage" includes the next first stem passageway 60b, and so forth.

Those skilled in the art will readily appreciate that although the exemplary embodiment of the stem 14 and cage 12 include a diametrically opposed pair of the first fluid passageway columns 30 which each include twenty stages, other embodiments of the control trim 10 may include fewer than twenty stages or more than twenty stages without departing from the spirit and scope of the present invention.

When the stem 14 is in the first position, the second stem and cage passageways 62, 46 remain out of alignment with each other, and the uppermost second stem passageway 62a remains within the cage 12 to prevent fluid from entering the uppermost second stem passageway 62a. In this regard, the second fluid passageway column 32 remains closed when the stem 14 is in the first position.

The valve stem 14 may continue to move from the first position toward a second position, wherein the beveled end portion 26 of the stem 14 is spaced farther from the valve seat 28 relative to the spacing between the beveled end portion 26 and the valve seat 28 when the stem 14 is in the first position. Furthermore, the first stem passageways 60 are further aligned with the first cage passageways 44. In this regard, as fluid flows between the stem 14 and the cage 12, the pressure drop achieved by passage therethrough is less than when the stem 14 is in the first position. In particular, when the stem 14 is in the first position, only a small portion of the first stem and cage passageways 60, 44 are aligned with each other, which results in fluid to passing through a very small opening as the fluid flows between the stem 14 and the cage 12. However, when the stem 14 is in the second position, a larger portion of the first stem and cage passageways 60, 44 are brought into alignment with each other, and thus, the opening through which the fluid travels between the stem 14 and cage 12 is larger, resulting in a smaller pressure drop.

In the second position, the second stem and cage passageways 62, 46 remain out of alignment with each other, and the uppermost second stem passageway 62a remains within the cage 12, thereby preventing fluid from entering therein.

Figure 7:
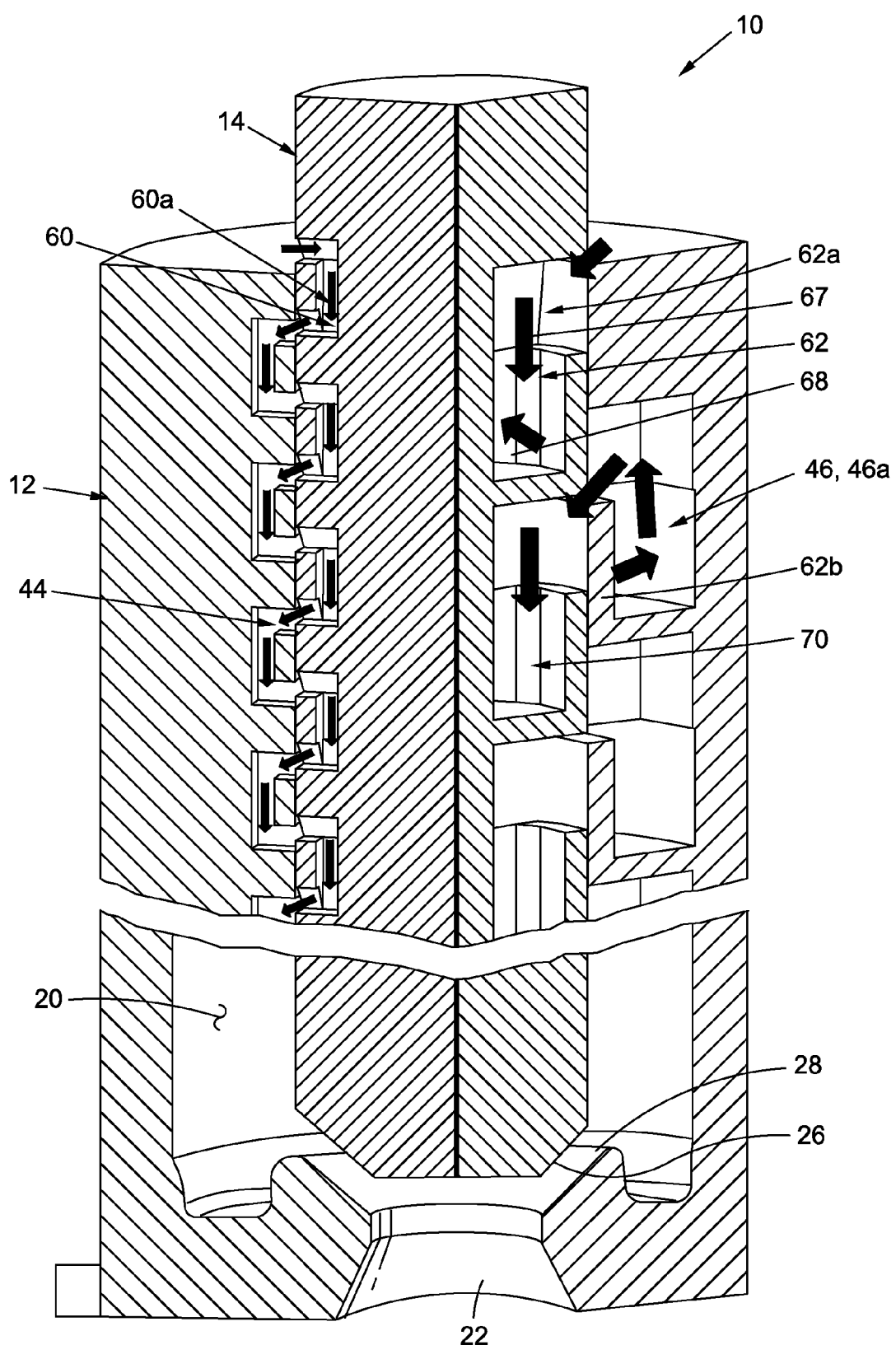
FIG. 7 is a perspective sectional view of the valve stem of the control valve as moved to a second position relative to the cage to bring the first set of cage and stem passages into even more complete alignment with each other and a second set of cage and stem passages into partial alignment with each other to define a second fluid passageway column through the control valve.

Referring now to FIG. 7 (which corresponds to FIG. 2), the stem 14 is shown in the third position. When the stem 14 is in the third position, both the first and second fluid passageway columns 30, 32 are opened to allow for simultaneous fluid flow through both columns 30, 32, as described below.

As to the first fluid passageway columns 30, the placement of the stem 14 in the third position results in alignment between the first stem and cage passageways 60, 44. A portion of the first stem and cage passageways 60, 44 may remain out of alignment with each other, although the majority of the first stem and cage passageways 60, 44 are aligned with each other when the stem 14 is in the third position. Furthermore, when the stem 14 is in the third position, the opening in each uppermost first stem passageway 60a is completely advanced out of the cage 12, resulting in unobstructed fluid flow into each first stem passageway 60a. FIG. 7 shows arrows representative of the fluid flow through one of the two first fluid passageway columns 30.

With regard to the second fluid passageway columns 32, the placement of the stem 14 in the third position results in a portion of the uppermost second stem passageways 62a thereof being advanced out of the cage 12, thereby allowing fluid to enter the second stem passageways 62. FIG. 7 includes arrows representative of fluid flow through one of the two second fluid passageway columns 32 preferably included in the trim 10. In particular, fluid enters the uppermost second stem passageways 62a through an opening between the stem 14 and cage 12. Fluid then flows down an axial channel portion 67 and into arcuate channel portion 68. The fluid then exits the stem 14 via a separate opening (not shown) and enters the cage 12. The fluid flows through the uppermost second cage passageways 46a, first through an arcuate channel portion, and then upwardly along axial channel portion 56, over wall 70 and through an opening to enter the next, corresponding second stem passageway 62b.

The fluid continues through the series of second stem and cage passageways 62, 46 until the fluid enters the discharge chamber 20. Particulate/debris which may be present in the fluid is collected in the discharge chamber 20 before the fluid exits through the outlet 22. In this regard, the second fluid passageway columns 32 each include a series of twists and turns which results in a pressure drop in the fluid passing therethrough. Furthermore, the passage of the fluid through the small openings formed between the stem 14 and cage 12 additionally enhances the pressure drop of the fluid.

In the exemplary embodiment depicted in FIG. 1, each second fluid passageway column 32 includes twelve "stages." As described above, each "stage" includes respective one of the second stem passageways 62 or second cages passageways 46. Thus, the first stage includes the uppermost second stem passageway 62a, while the second stage includes the uppermost second cage passageway 46a. The remaining stages include the subsequent second stem and cage passageways 62, 46 included in the stem 14 and cage 12.

Although the exemplary embodiment includes twelve stages in each second fluid passageway column 32, it is understood that other embodiments may include more than twelve stages or less than twelve stages without departing from the spirit and scope of the present invention.

Figure 8:
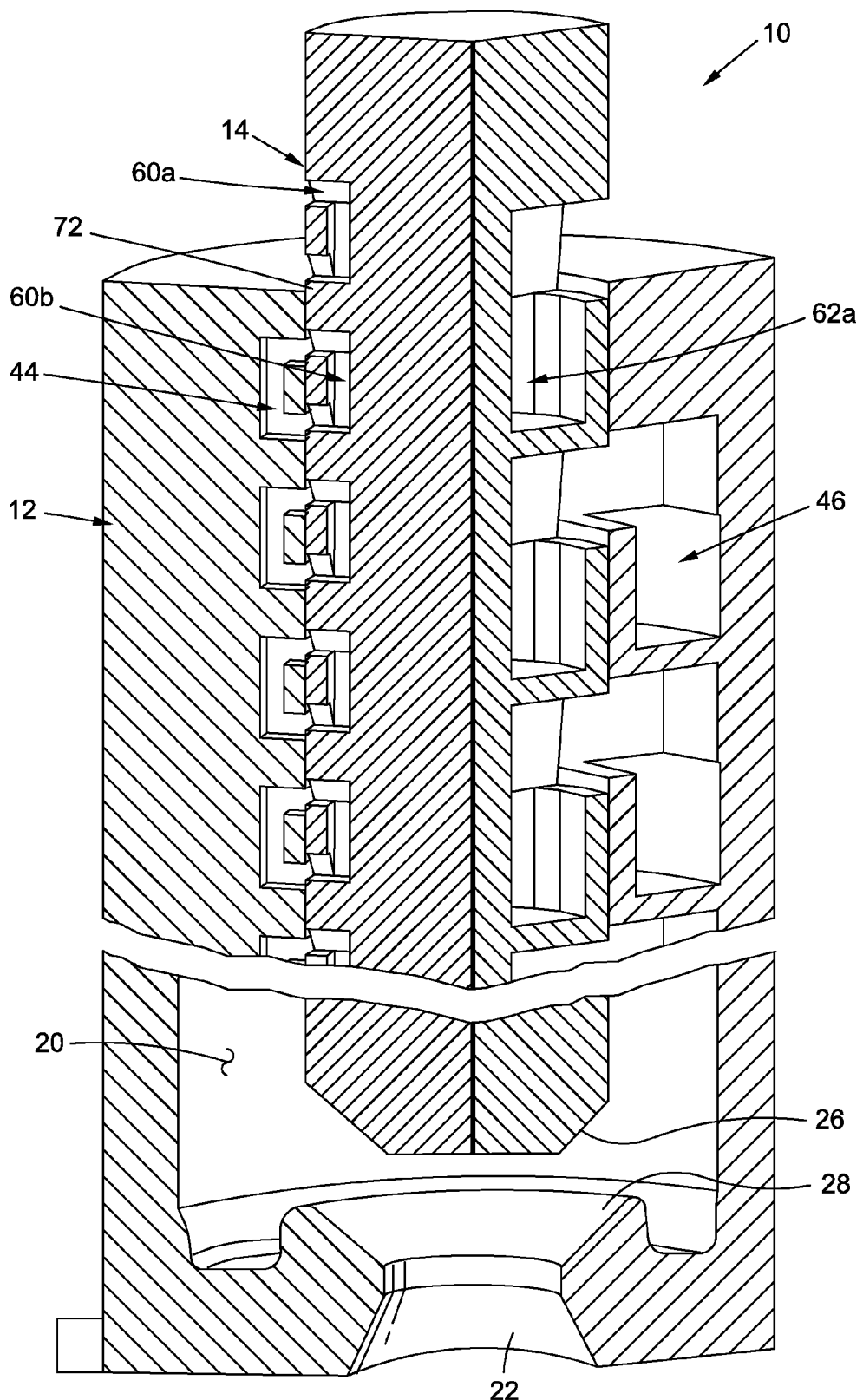
FIG. 8 is a perspective sectional view of the valve stem of the control valve as moved to a third position relative to the cage to bring the first set of cage and stem passages out of alignment with each other thereby closing the first fluid passageway column, and the second set of cage and stem passages into more complete alignment with each other.

Reference is now made to FIG. 8, which shows the valve stem 14 in a fourth position. In the fourth position, each first fluid passageway column 30 is closed and each second fluid passageway column 32 is open, which results in fluid passing through the trim 10 exclusively through the second fluid passageway columns 32.

With regard to the first fluid passageway columns 30, the stem 14 is positioned such that the first stem passageways 60a are completely outside of the cage 12, while the immediately adjacent first stem passageways 60b remains within the cage 12. In this regard, the wall 72 disposed between each uppermost first stem passageway 60a and the immediately adjacent first stem passageway 60b effectively blocks fluid from entering the corresponding first stem passageway 60b, thereby closing the corresponding first fluid passageway column 30.

Each second fluid passageway column 32 is open, and the second stem and cage passageways 62, 46 are brought into more complete alignment relative to their alignment when the stem 14 is in the third position. In this regard, a greater portion of the second stem passageways 62 overlap with the corresponding ones of the second cage passageways 46 when the stem 14 is in the fourth position.

Control valves including a trim (e.g., the trim 10) constructed in accordance with various aspects of the present invention may be used in liquid services which are required to withstand large pressures drops (e.g., around 200 bar), and cavitating services. The pressure drop achieved by the control valve including a trim like the trim 10 is split across a number of stages. The design of a trim like the trim 10 is also tolerant to the presence of particles in the fluid, and as such, can be used in a wide range of dirty fluid applications, even for compressible fluids. Such a trim may be particularly suited for Once-Through-Cooling (OTC) valves which require very small minimum Cv and large rangeability. A trim like the trim 10 is also easy to clean. Along these lines, the debris/particulate collected in the discharge chamber 20 of the trim 10 may be self-cleaned at higher flow rates.

Figures 9, 10:
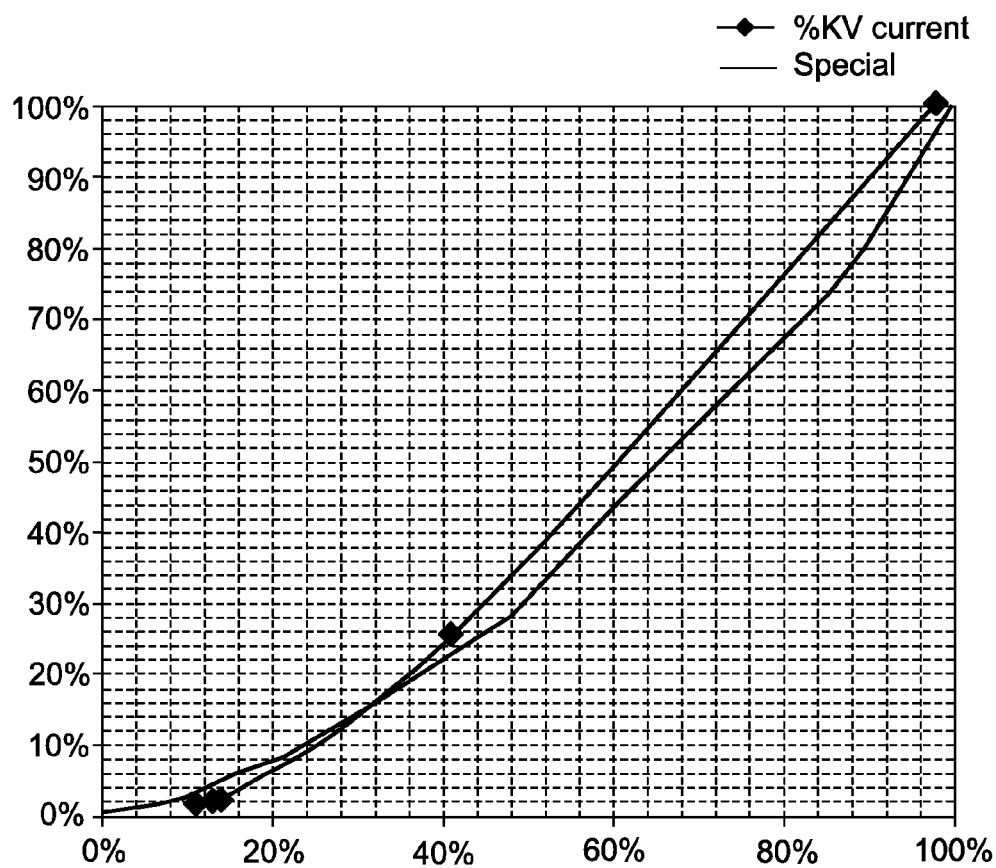
FIGS. 9 and 10 show testing results using a control valve constructed in accordance with the basic principles of present invention.
Figure 11:
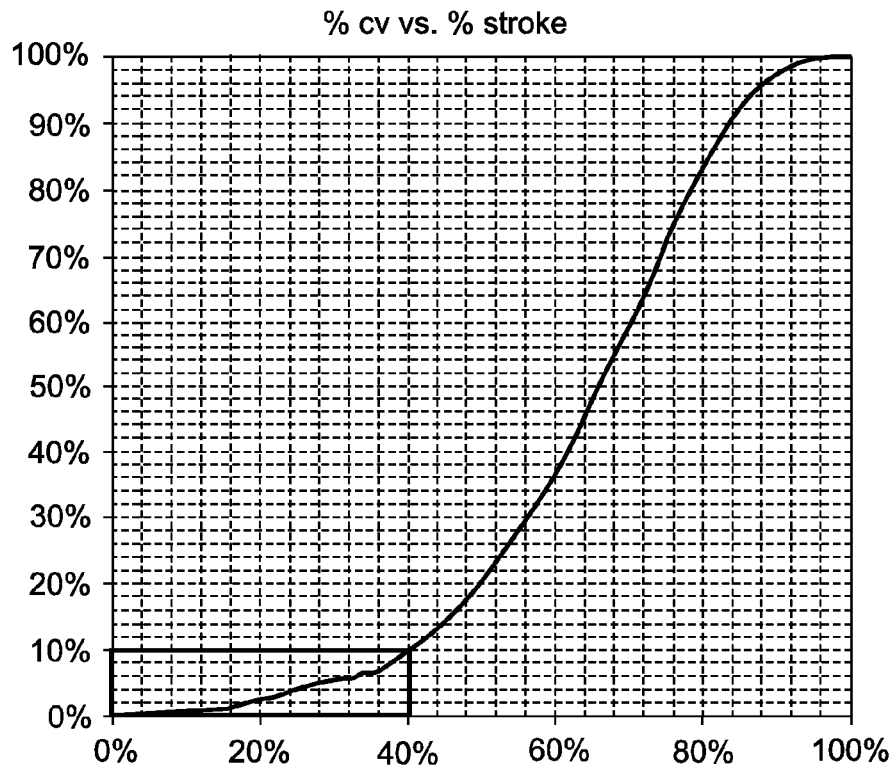
FIGS. 11 and 12 show performance of a control valve constructed in accordance with the basic principles of the present invention and having a first set of prescribed characteristics.
Figure 12:
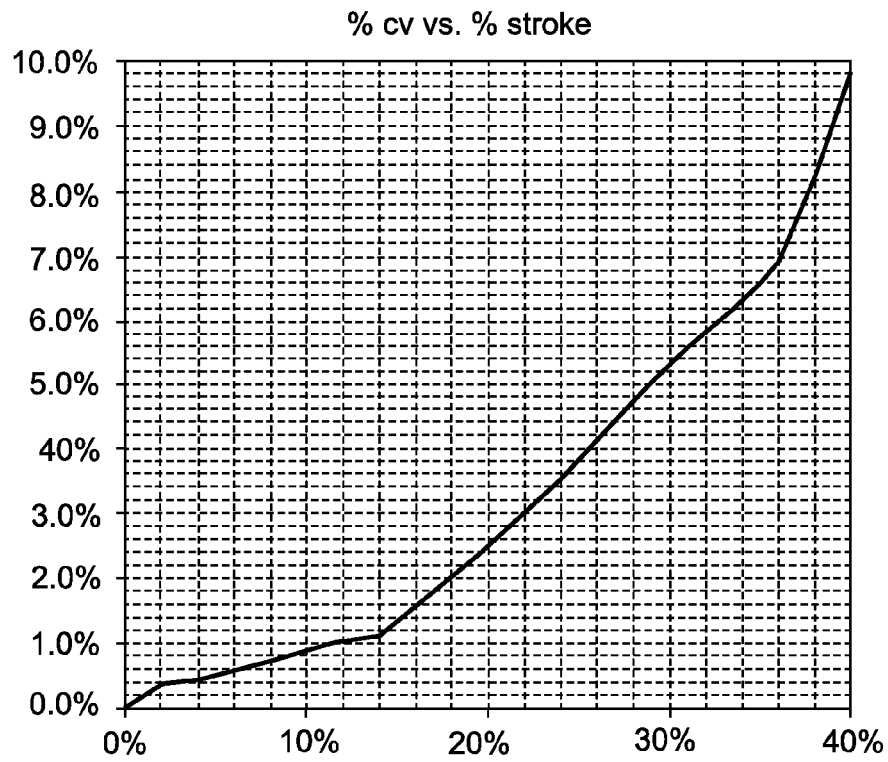

FIGS. 9 and 10 show testing results using a control valve which may comprise the trim 10 or a variant thereof as constructed in accordance with the basic principles of present invention. Furthermore, FIGS. 11 and 12 show performance of such control valve exhibiting the following characteristics:

Seat Diameter—25 mm
Plug OD Size—45 mm
Plug Length—210 mm
Required Stroke—28 mm
Rated Cv—19.5
Rangeability—359;
Max velocity at 200 bar pressure drop in leakage flow—46 m/s.

The table shown in FIG. 9 demonstrates that the control valve is capable of limiting the maximum velocity in the trim included therein and the clearance passages, thus preventing undesirable cavitation or plug erosion.

The trim 10 disclosed above and shown in FIGS. 1-8 includes a pair of first fluid passageway columns 30 arranged in diametrically opposed relation to each other, and a pair of second fluid passageway columns 32 arranged in diametrically opposed relation to each other, for a total of four fluid passageway columns extending through the trim. However, the trim 10 could also have only a single first fluid passageway column 30 and a single second fluid passageway column 32 arranged in a prescribed orientation relative to each other. In another embodiment of the invention, the trim includes a third fluid passageway column. In this regard, the trim may only include three fluid passageway columns (i.e., one first fluid passageway column, one second fluid passageway column, and one third fluid passageway column) or six fluid passageway columns (i.e., two first fluid passageway columns, two second fluid passageway columns, and two third fluid passageway columns).

Figure 13:
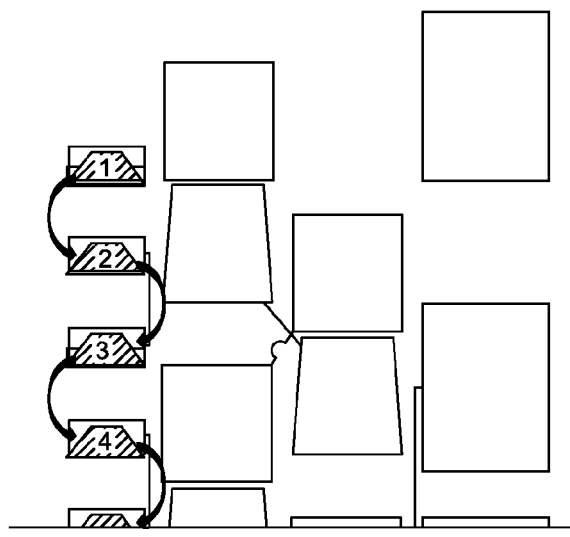
FIGS. 13-15 are schematic representations of flow through the first, second, and third fluid passageway columns depending on the stroke of the stem.
Figure 14:
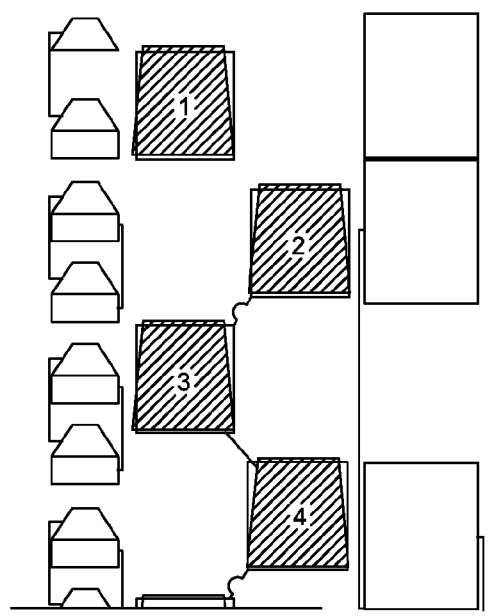
Figure 15:
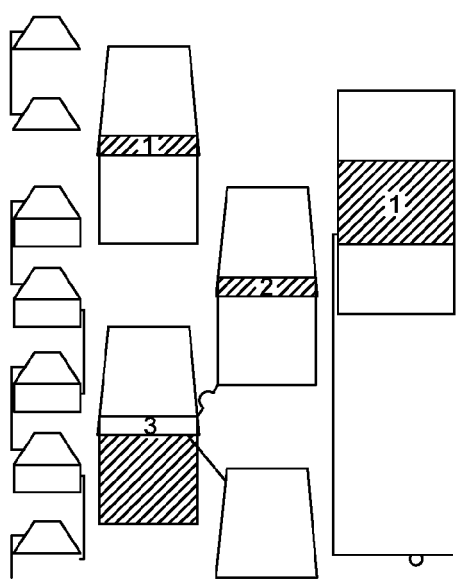

Reference is now made to FIGS. 13-15, which show schematics of a trim having first, second, and third fluid passageway columns. According to one embodiment, the first fluid passageway column is depicted on the left and includes twenty stages, the second fluid passageway column is depicted in the middle and includes twelve stages, while the third fluid passageway column is depicted on the right and includes four stages. FIGS. 13-15 show schematic representations of flow through the first, second, and third fluid passageway columns depending on the stroke of the stem. The trapezoidal shapes denote cavities in the stem, while the rectangular shapes denote cavities in the cage. When there is an overlap between the trapezoidal shapes and the rectangular shapes, there is fluid communication between the stem and the cage within the associated fluid passageway column.

A small stroke of the stem results in overlap between the stem and cage openings in the left column (i.e., the first fluid passageway), while the stem and cage openings in the middle and right columns are spaced from each other. Therefore, only the first fluid passageway column is open, resulting in fluid through the twenty stages of the first column.

A medium stroke of the stem results in overlap between the stem and cage openings in the middle column (i.e., the second fluid passageway), while the stem and cage openings in the left and right columns are spaced from each other. Therefore, only the second fluid passageway column is open, resulting in fluid through the twelve stages of the second column.

A large stroke of the stem results in overlap between the stem and cage openings in both the middle and right columns (i.e., the second and third fluid passageways), while the stem and cage openings in the left column are spaced from each other. The degree of overlap is greater in the right column and smaller in the middle column. Therefore, the majority of the fluid flow is through the third fluid passageway column, while a small portion of the fluid flow is simultaneously through the second fluid passageway column. The first fluid passageway column is closed, with no fluid flowing therethrough in response to a large stroke.

FIGS. 16-25 depict an exemplary version of a trim 110 and the components thereof, which embodies the structural and functional parameters of the trim schematically shown and described in FIGS. 13-15. More particularly, the trim 110 includes a cage 112 (see FIG. 16), an outer sleeve 154 (see FIGS. 19-25), a stem 114 (see FIG. 17) and a stem sleeve 168 (see FIG. 18). The trim 110 is specifically configured and adapted to create at least three distinct fluid passageway columns, e.g., a first fluid passageway column 130, a second fluid passageway column 132, and a third fluid passageway column 133, having a separate number of "stages" associated therewith.

Figure 16:
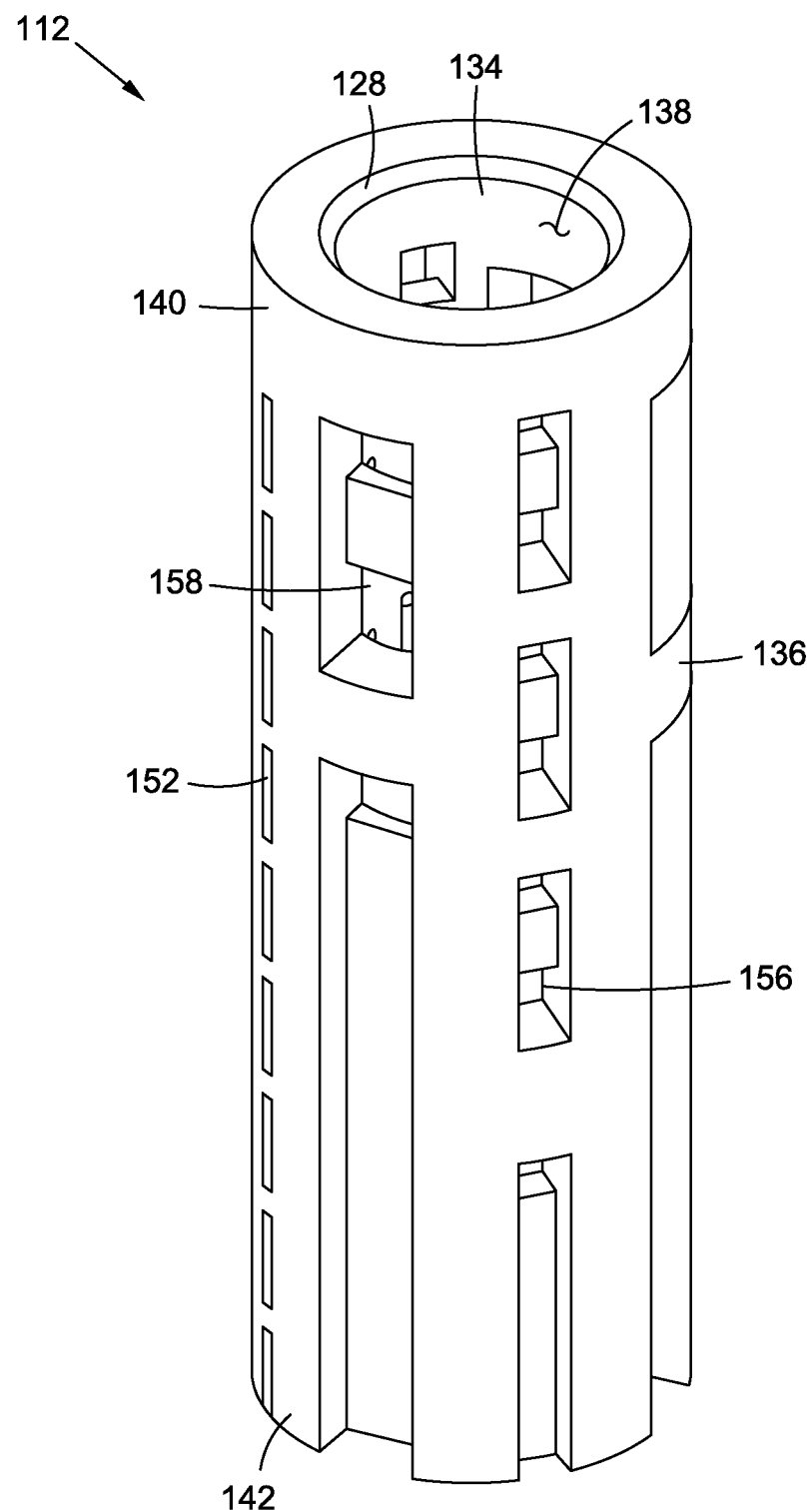
FIG. 16 is a perspective view of a cage adapted for use in a cascade trim which may be integrated into a fluid control valve constructed in accordance with a second embodiment of the present invention.

Referring now specifically to FIG. 16, the cage 112 has a generally cylindrical configuration and includes an inner surface 134 as well as an outer surface 136, with a central bore 138 extending axially through the cage 112 from a first end portion 140 to an opposing second end portion 142 thereof. The exemplary cage 112 includes a valve seat 128 disposed at the upper end portion 140 thereof, although those skilled in the art will readily understand that the cage 112 may be constructed such that the valve seat is at the lower end of the cage 112, similar to the configuration described above in relation to cage 12.

Figure 19:
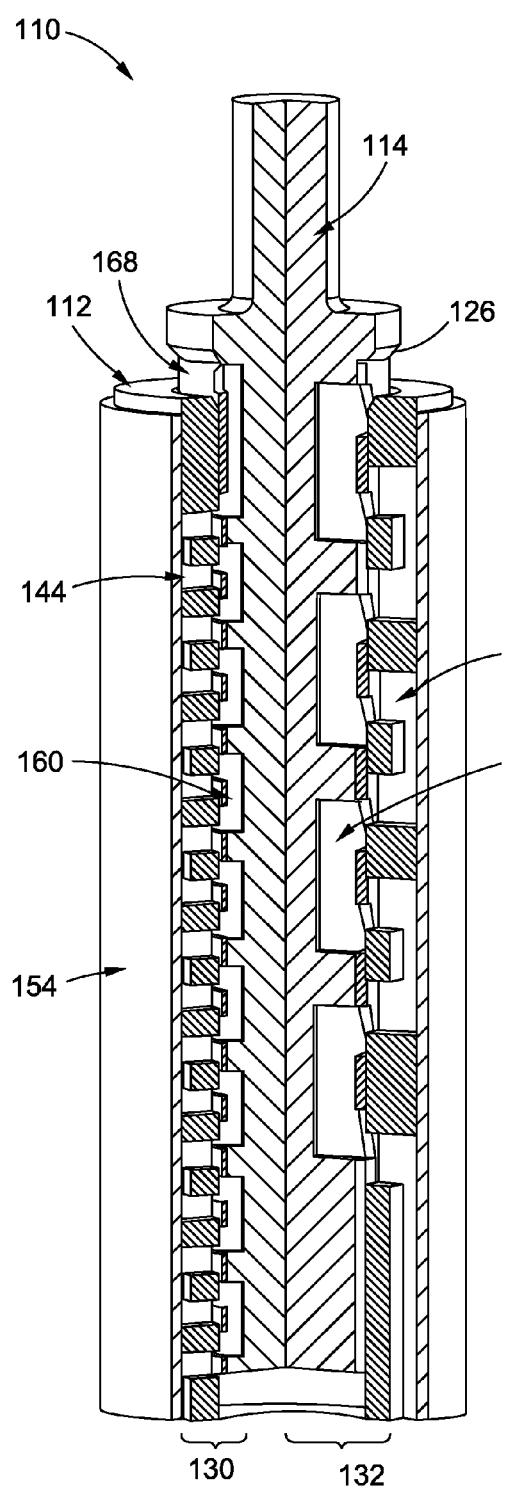
FIG. 19 is a perspective sectional view of the second embodiment of the trim illustrating first and second fluid passageway columns within a fluid control valve.
Figure 20:
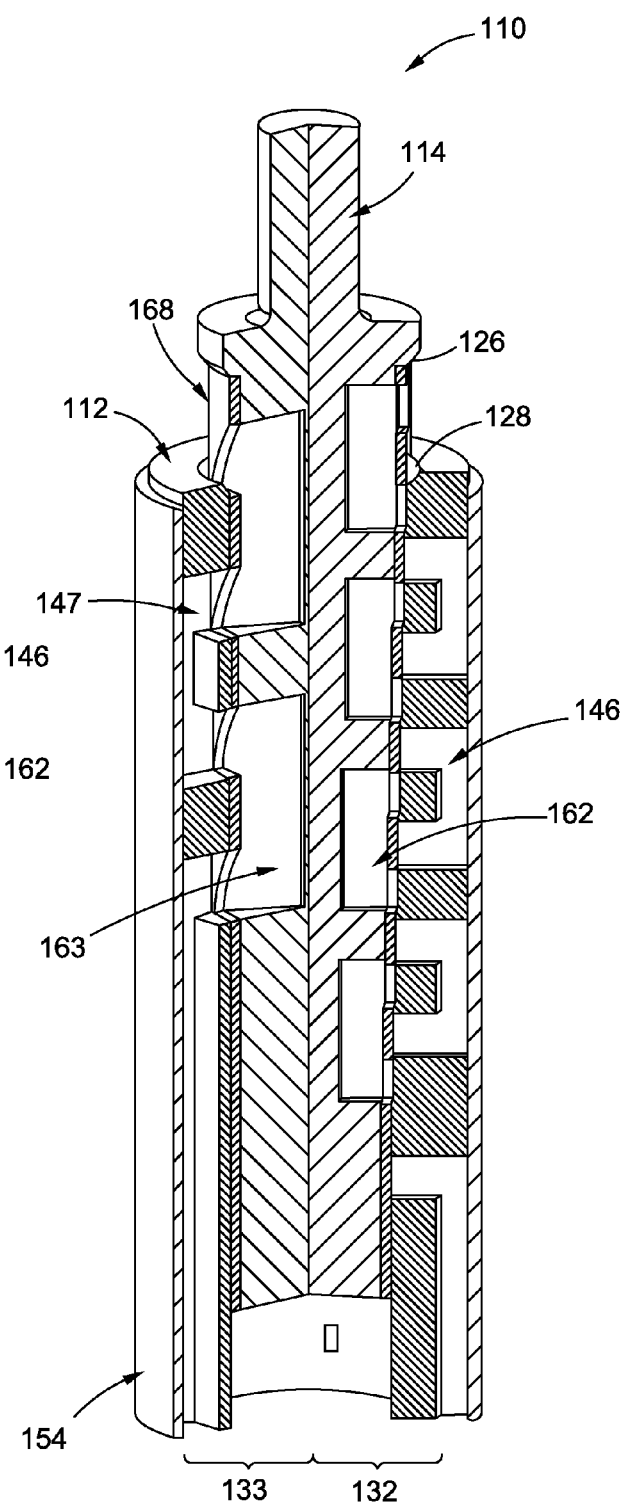
FIG. 20 is a perspective sectional view of the second embodiment of the trim illustrating second and third fluid passageway columns within the fluid control valve depicted in FIG. 19.

The cage 112 includes a plurality of passageways formed therein, wherein the passageways define respective portions of the first, second, and third fluid passageway columns 130, 132, 133 (see FIGS. 19-20). The cage passageways used in forming the first fluid passageway column 130 will be referred to herein as the first cage passageways 144, the cage passageways used in forming the second fluid passageway column 132 will be referred to herein as the second cage passageways 146, and the cage passageways used in forming the third fluid passageway column 133 will be referred to herein as the third cage passageways 147.

In the embodiment depicted in FIG. 16, the first cage passageways 144 are associated with the small slots 152 arranged in a linear array on the outer surface of the cage 112. The first cage passageways 144 extend into the cage 112 and define generally U-shaped channels having openings 148 (see FIG. 21) in communication with the central bore 138. The first cage passageways 144 are preferably arranged in two diametrically opposed arrays.

The second cage passageways 146 are associated with the medium-sized, generally quadrangular-shaped openings 156 arranged in a linear array on the outer surface of the cage 112. The second cage passageways 146 extend into the cage 112 and define generally U-shaped channels having openings 150 (see FIG. 21) in communication with the central bore 138. The cage 112 preferably includes two sets of second passageway openings 150 arranged in diametrically opposed relation to each other.

The third cage passageways 147 are associated with the large-sized openings 158 disposed on the outer surface of the cage 112 and positioned between the arrays of first and second cage passageways 144, 146. The third cage passageways 147 extend into the cage 112 and define generally U-shaped channels having openings 151 (see FIG. 23) in communication with the central bore 138. The cage 112 preferably includes four sets of third passageway openings 151, arranged in two pairs of diametrically opposed sets.

An outer cage sleeve 154 which may be disposed about the cage 112 for sealing the outer surface of the cage 112, thus defining individual flow passages within the cage 112. More specifically, the outer sleeve 154 preferably covers the openings 152, 156 and 158 to close off the first, second, and third cage passageways 144, 146, 147 at the outer surface of the cage 112. The outer sleeve 154 is preferably brazed or shrink fitted to the cage 112.

Figure 17:
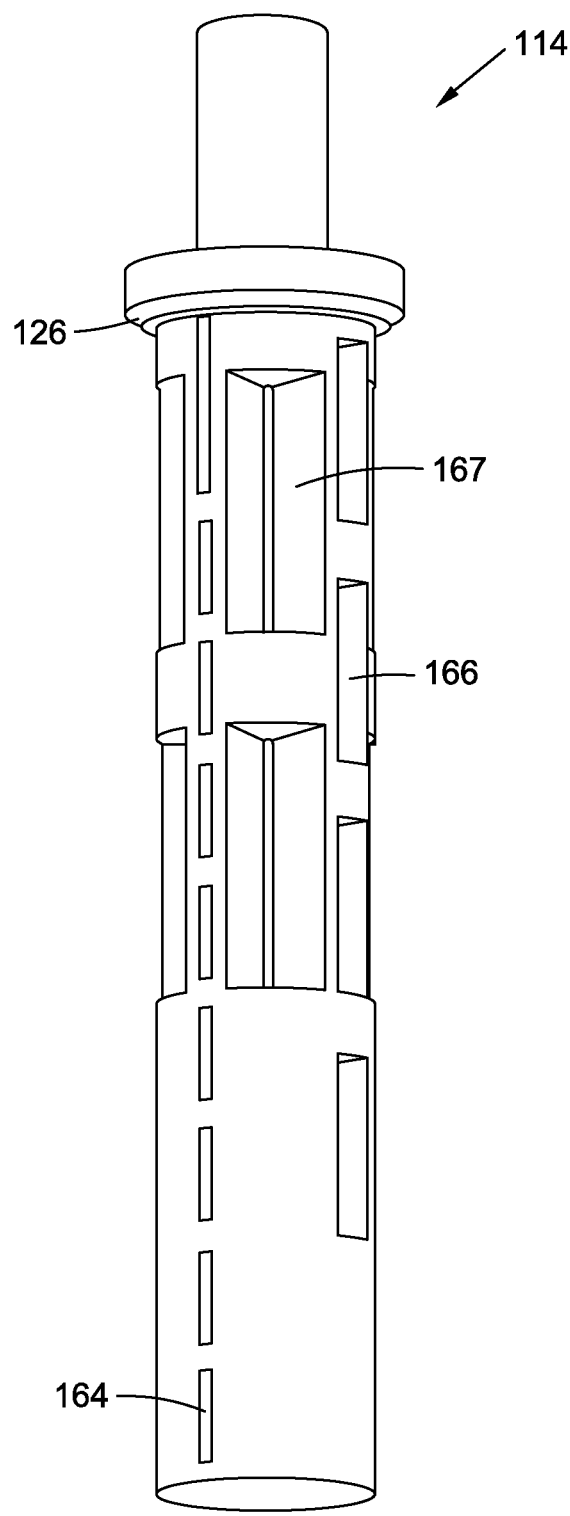
FIG. 17 is a perspective view of the stem constructed for use with the cage depicted in FIG. 16.

FIG. 17 shows a valve stem 114 configured for use with the cage 112. In this regard, the valve stem 114 includes a beveled upper flange 126 which cooperates with the valve seat 128 to close the trim 110. The valve stem 114 further includes a plurality of stem passageways which are complimentary to the cage passageways 144, 146, 147 described above for use in forming the first, second, and third fluid passageway columns 130, 132, 133. The stem passageways used in forming the first fluid passageway column 130 will be referred to herein as the first stem passageways 160 (see FIG. 19), the stem passageways used in forming the second fluid passageway column 132 will be referred to herein as the second stem passageways 162 (see FIG. 19), while the stem passageways in forming the third fluid passageway column 133 will be referred to herein as the third stem passageways 163 (see FIG. 20). The first stem passageways 160 are associated with the smaller first stem openings 164 formed on the outer surface of the stem 114, the second stem passageways 162 are associated with the medium-sized second stem openings 166 formed on the outer surface of the stem 114, and the third stem passageways 163 are associated with the large third stem openings 167 formed on the outer surface of the stem 114. Each stem passageway 160, 162, 163 is a generally U-shaped passageway having a pair of openings in communication with the outer surface of the stem 114.

The preferred embodiment of the stem 114 includes diametrically opposed pairs of first and second stem passageways 160, 162, which are complimentary to the diametrically opposed pairs of first and second cage passageways 144, 146 formed in the cage 112. Furthermore, the stem 114 additionally preferably includes four third stem passageways 163 arranged in two pairs of diametrically opposed sets which are complimentary to the four third cage passageways 147 described above.

Figure 18:
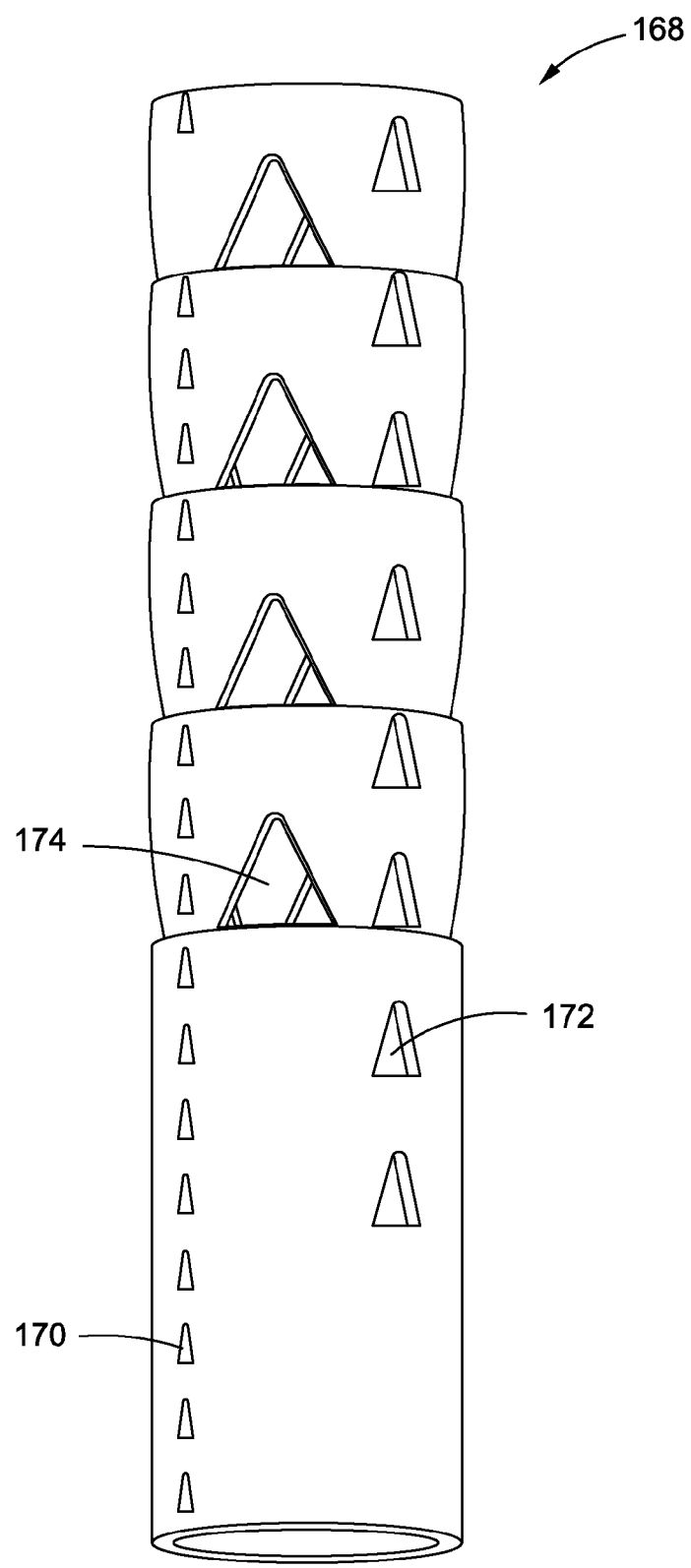
FIG. 18 is a perspective view of a stem sleeve constructed for use with the stem depicted in FIG. 16.

FIG. 18 is a perspective view of stem sleeve 168 which is disposed about the stem 114. The stem sleeve 168 is preferably assembled in one piece with the stem 114, and includes several openings which are in fluid communication with the stem passageways 160, 162, 163. For instance, the stem sleeve 168 includes a plurality of first sleeve openings 170, a plurality of second sleeve openings 172, and a plurality of third sleeve openings 174 which correspond to respective ones of the first stem passageways 160, the second stem passageways 162, and the third stem passageways 163. The first, second and third sleeve openings 170, 172, 174 may cooperate with the first, second and third stem openings 164, 166, 167 to collectively define the first, second and third stem passageways 160, 162, 163. In the exemplary embodiment, the openings 170, 172, 174 formed in the stem sleeve 168 each have a generally triangular shape, although any shape is possible for achieving desired trim characteristics.

The cage 112, cage sleeve 154, stem 114, and stem sleeve 168 are preferably fabricated through the use of a DMLS process as is described above, although other manufacturing techniques known in the art may also be used without departing from the spirit and scope of the present invention.

The cage 112, cage sleeve 154, stem 114, and stem sleeve 168 are assembled in the manner depicted in FIGS. 19 and 20. When assembled, the stem 114 and stem sleeve 168 are axially moved to selectively open and close the first, second and third fluid passageway columns 130, 132, 133 to achieve desired trim parameters. The cross sectional view depicted in FIG. 19 shows the first and second fluid passageway columns 130, 132, while FIG. 20 shows the second and third fluid passageway columns 132, 133.

With the basic structural features of the trim 110 described above, the following discussion pertains to operation of an exemplary control valve including the cascade trim 110. When the trim 110 of the control valve is in its closed position, the beveled upper flange 126 of the stem 114 is engaged with the upper valve seat 128 to close the valve inlet 116 and to prevent fluid from entering the first, second and third fluid passageway columns 130, 132, 133.

Figure 21:
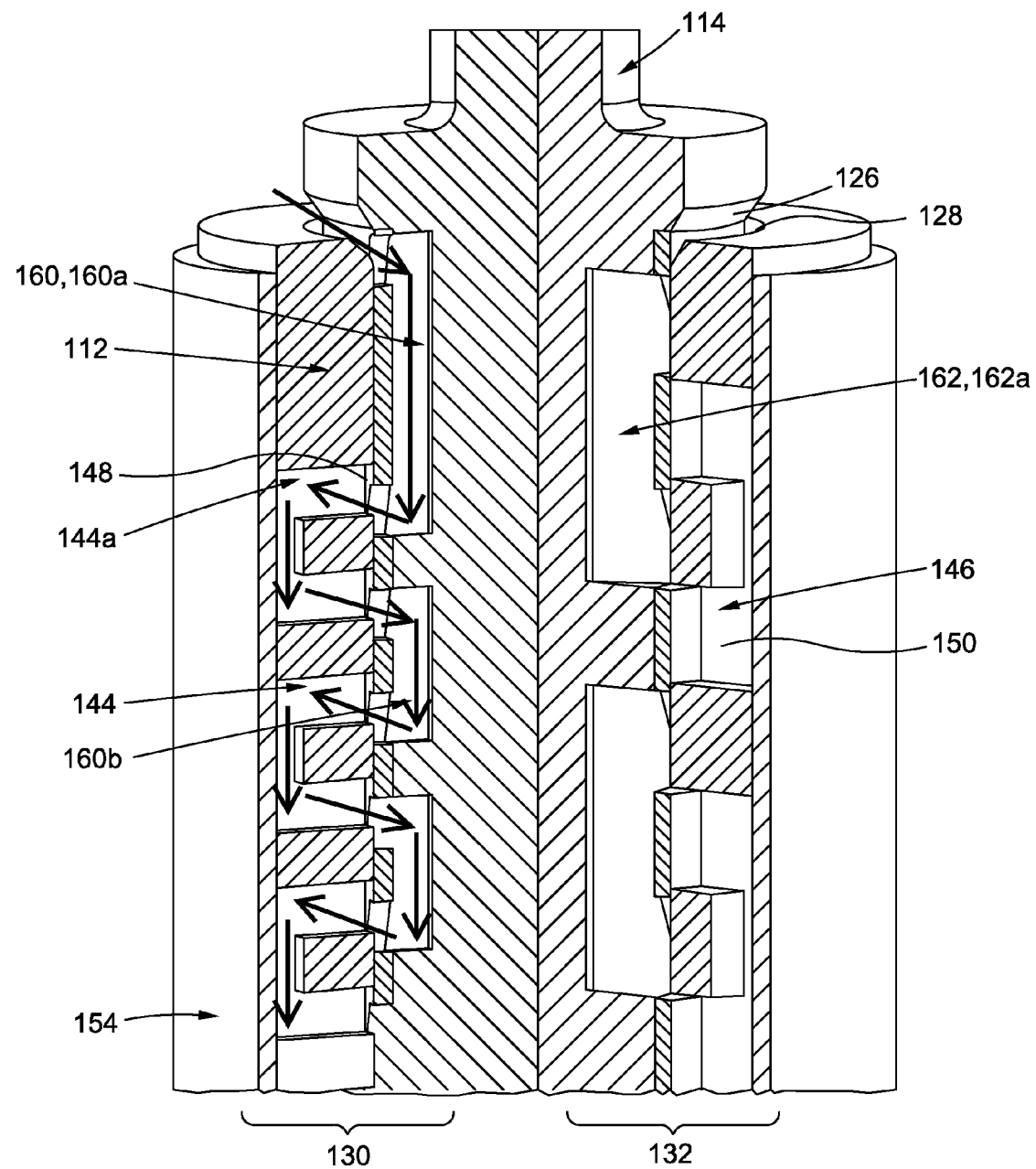
FIG. 21 is a partial perspective sectional view of a second embodiment of the trim, wherein the stem and stem sleeve are in a first position relative to the cage.

FIG. 21 shows the trim 110 of the control valve in a first open position. The valve stem 114 has been moved slightly from the closed position, with the beveled flange 126 of the stem 114 lifted from the valve seat 128 to allow for fluid passage through the valve inlet 116. Furthermore, the axial movement of the stem 114 causes a portion of the uppermost first stem passageway 160a to rise out of the cage 112, thereby exposing a portion of the uppermost first stem passageway 160a to fluid at the inlet 116. In addition, the first stem passageways 160 are brought into partial alignment with the first cage passageways 144 to create the first fluid passageway column 130 through the trim 110. As such, fluid may flow from the inlet to the outlet via the first fluid passageway column 130.

FIG. 21 additionally shows arrows representative of the fluid flow through that portion of the first passageway column 130 depicted in FIG. 21. As can be seen, the fluid flows through a very small opening created between the cage 112 and the stem 114, and into each uppermost first stem passageway 160a. The fluid flows through the uppermost first stem passageway 160a, which is a generally U-shaped passageway, and then into the corresponding uppermost first cage passageway 144a. Once again, the fluid must pass through a very small opening between the stem 114 and the cage 112 to flow therebetween. Once inside the uppermost first cage passageway 144a, the fluid flows through the generally U-shaped passage, and into the next, corresponding first stem passageway 160b. The fluid continues to flow through alternating first stem passageways 160 and first cage passageways 144 until the fluid enters the discharge chamber at the bottom of the cage 112.

In the exemplary cage 112 and stem 114 depicted in FIGS. 16 and 17, the fluid passes through eighteen "stages" as the fluid flows through the entirety of each of the first fluid passageway columns 130. Each "stage" is represented by a respective one of the first stem passageways 160 or the first cage passageways 144. In other words, the first "stage" includes the uppermost first stem passageway 160a, the second "stage" includes the uppermost first cage passageway 144a, the third "stage" includes the next first stem passageway 160b, and so forth.

Those skilled in the art will readily appreciate that although the exemplary embodiment of the stem 114 and cage 112 include a diametrically opposed pair of the first fluid passageway columns 130 which each include eighteen stages, contemplated variants of the cascade trim 110 may include fewer than eighteen stages or more than eighteen stages and/or greater or fewer than two first fluid passageway columns 130 without departing from the spirit and scope of the present invention.

When the stem 114 is in the first position, the second stem and cage passageways 162, 146 remain out of alignment with each other, and the uppermost second stem passageway 162a remains within the cage 112 to prevent fluid from entering the uppermost second stem passageway 162a. In this regard, the second fluid passageway column 132 remains closed when the stem 114 is in the first position.

Furthermore, although not seen in the perspective shown in FIG. 21, when the stem 114 is in the first position, the third stem and cage passageways 163, 147 also remain out of alignment with each other, and the uppermost third stem passageway 163a remains within the cage 112 to prevent fluid from entering the uppermost third stem passageway 163a. In this regard, the third fluid passageway column 133 remains closed when the stem 114 is in the first position.

Figure 22:
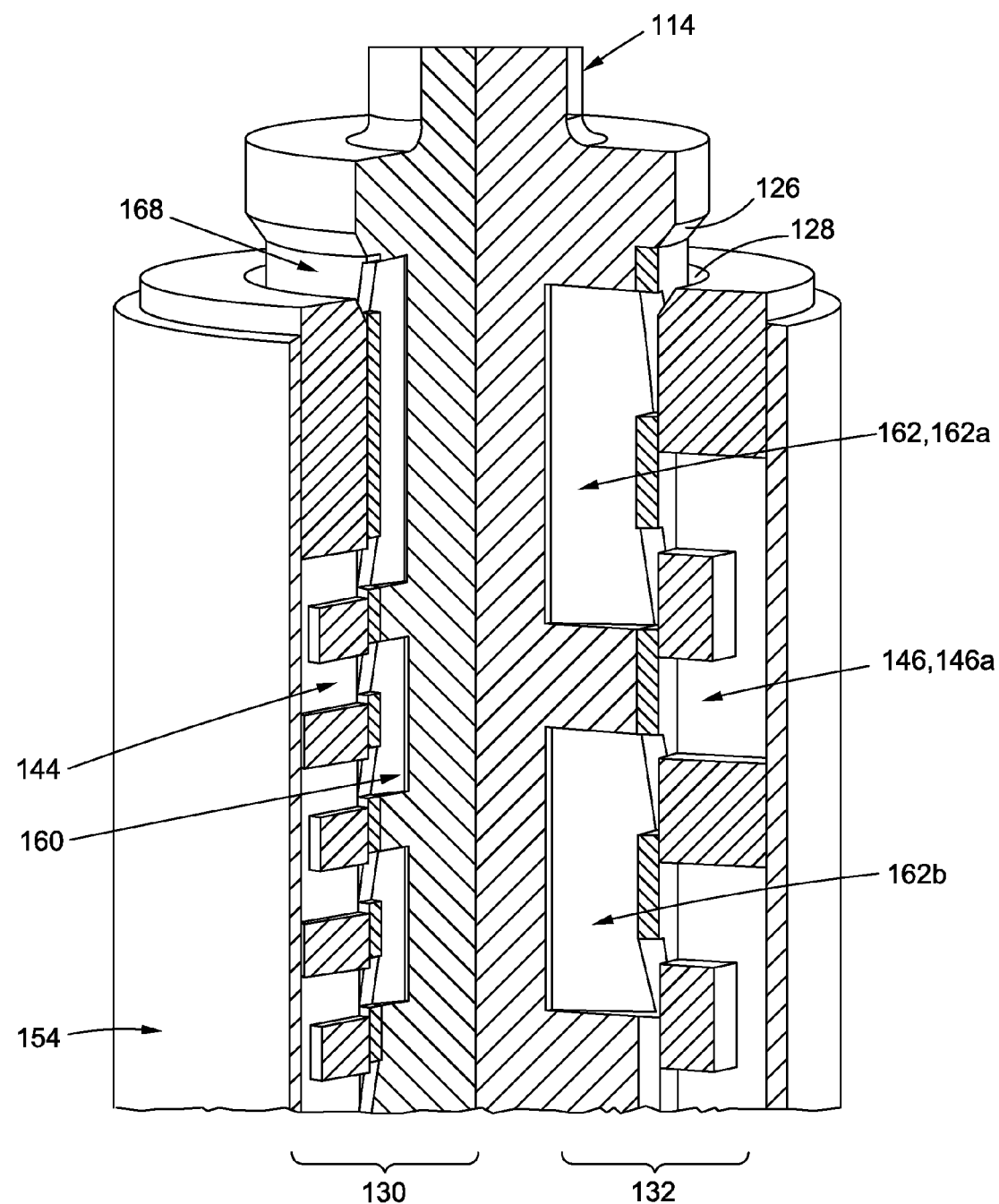
FIG. 22 is a partial perspective sectional view of the second embodiment of the trim, wherein the stem and stem sleeve are in a second position relative to the cage.

Referring now to FIG. 22, the valve stem 114 is shown in a second position, which results in fluid simultaneously flowing through both the first and second fluid passageway columns 130, 132, while the third fluid passageway column 133 remains closed, as described below. In the second position, the beveled flange 126 of the stem 114 is spaced farther from the valve seat 128 relative to the spacing between the beveled flange 126 and the valve seat 128 when the stem 114 is in the first position. Furthermore, the first stem passageways 160 are further aligned with the first cage passageways 144. In this regard, as fluid flows between the stem 114 and the cage 112, the pressure drop achieved by passage therethrough is less than when the stem 114 is in the first position. In particular, when the stem 114 is in the first position, only a small portion of the first stem and cage passageways 160, 144 are aligned with each other, which results in fluid to passing through a very small opening as the fluid flows between the stem 114 and the cage 112. However, when the stem 114 is in the second position, a larger portion of the first stem and cage passageways 160, 144 are brought into alignment with each other, and thus, the opening through which the fluid travels between the stem 114 and cage 112 is larger, resulting in a smaller pressure drop.

In the second position, a portion of the second stem and cage passageways 162, 146 are aligned with each other, and a portion of the uppermost second stem passageway 162a is advanced out of the cage 112, to allow fluid to enter the second stem passageways 162. Fluid enters the uppermost second stem passageways 162a through an opening between the stem 114 and cage 112. The fluid then exits the stem 114 and enters the cage 112. The fluid flows through the uppermost second cage passageways 146a, and through an opening to enter the next, corresponding second stem passageway 162b. The fluid continues through the series of second stem and cage passageways 162, 146 until the fluid enters the discharge chamber, and ultimate exits the trim 110.

In the exemplary cage 112 and stem 114 depicted in FIGS. 16 and 17, the fluid passes through eight "stages" as the fluid flows through the entirety of each of the second fluid passageway columns 132. Each "stage" is represented by a respective one of the second stem passageways 162 or the second cage passageways 146. In other words, the first "stage" includes the uppermost first stem passageway 162a, the second "stage" includes the uppermost first cage passageway 146a, the third "stage" includes the next first stem passageway 162b, and so forth.

Those skilled in the art will readily appreciate that although the exemplary embodiment of the stem 114 and cage 112 include a diametrically opposed pair of the second passageway columns 132 which each include eight stages, contemplated variants of the cascade trim 110 may include fewer than eight stages or more than eight stages and/or greater or fewer than two second fluid passageway columns 132 without departing from the spirit and scope of the present invention.

Although not shown in the perspective depicted in FIG. 22, when the stem 114 is in the second position, the third stem and cage passageways 163, 147 also remain out of alignment with each other, and the uppermost third stem passageway 163a remains within the cage 112 to prevent fluid from entering the uppermost third stem passageway 163a. In this regard, the third fluid passageway column 133 remains closed when the stem 114 is in the first position.

Figure 23:
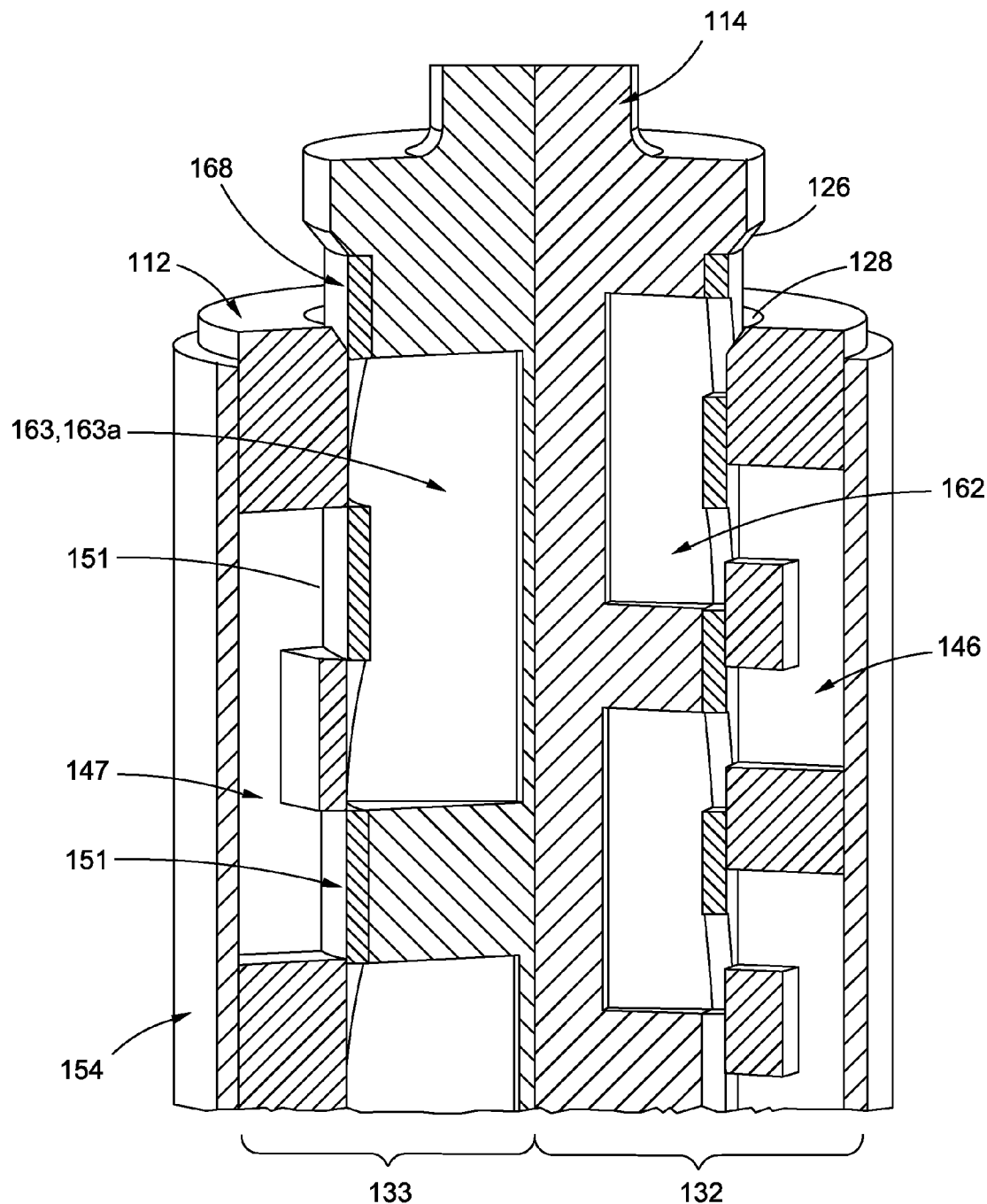
FIG. 23 is a partial perspective sectional view of the second embodiment of the trim, wherein the stem and stem sleeve are in a third position relative to the cage.

Referring now to FIG. 23, the stem 114 is shown in the third position. When the stem 114 is in the third position, both the first and third fluid passageway columns 130, 133 are closed, while the second fluid passageway column 132 is open. In particular, at least a portion of the second stem passageways 162 are aligned with the second cage passageways 146 to allow for fluid flow therebetween.

As shown in FIG. 23, the uppermost third stem passageway 163a remains within the cage 112 when the stem 114 is in the third position, thereby preventing fluid from entering the third fluid passageway column 133.

Furthermore, although not shown in the perspective depicted in FIG. 23, positioning the stem 114 in the third position results in the first stem passageways 160 being moved out of alignment with the first cage passageways 144 thereby closing the first fluid passageway column 130.

Figure 24:
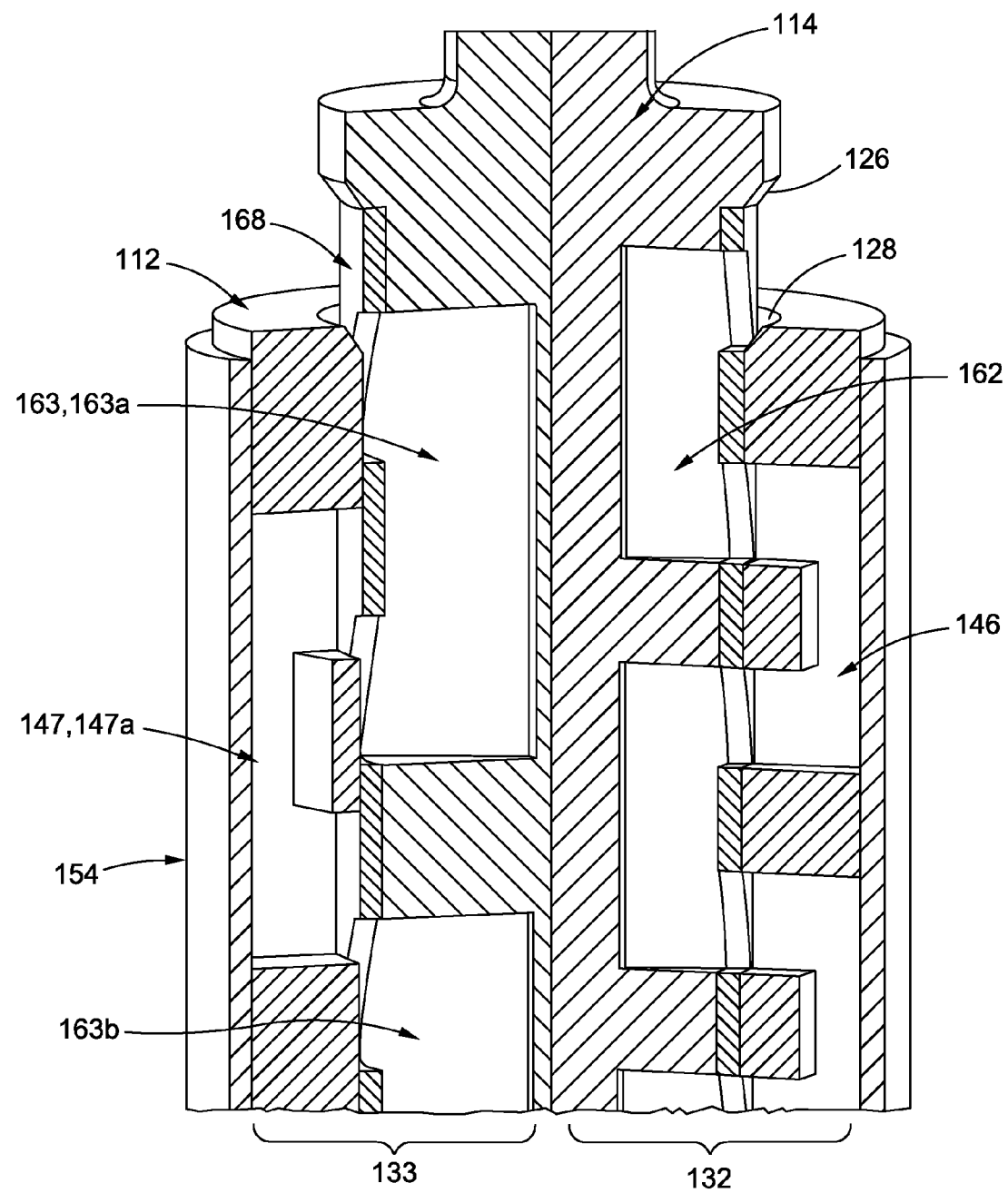
FIG. 24 is a partial perspective sectional view of the second embodiment of the trim, wherein the stem and stem sleeve are in a fourth position relative to the cage.

Referring now to FIG. 24, the stem 114 is shown in a fourth position, wherein the second and third fluid passageway columns 132, 133 are open. In this regard, the uppermost third stem passageway 163a is at least partially removed from the cage 112 to allow fluid to enter the uppermost third stem passageway 163a. Fluid flows through the uppermost third stem passageway 163a, and then into the uppermost third cage passageway 147a. The fluid continues into a subsequent third stem passageway 163, and then finally into a discharge chamber of the cage 112.

In the exemplary cage 112 and stem 114 depicted in FIGS. 16 and 17, the fluid passes through four "stages" as the fluid flows through the entirety of each of the third fluid passageway columns 133. Each "stage" is represented by a respective one of the third stem passageways 163 or the third cage passageways 147. In other words, the first "stage" includes the uppermost first stem passageway 163a, the second "stage" includes the uppermost third cage passageway 147a, the third "stage" includes the next third stem passageway 163b, and so forth.

Those skilled in the art will readily appreciate that although the exemplary embodiment of the stem 114 and cage 112 include two diametrically opposed pairs of the third fluid passageway columns 133 which each include four stages, contemplated variants of the cascade trim 110 may include fewer than four stages or more than four stages and/or greater or fewer than a total of four third fluid passageway columns 132 without departing from the spirit and scope of the present invention.

In the fourth position, the second stem and cage passageways 162, 146 are brought into substantially complete alignment with each other to allow fluid to flow through the second fluid passageway column 132.

In the preferred embodiment, although not shown, when the stem 114 is in the fourth position, the first fluid passageway column 130 is closed. More specifically, the first stem passageways 160 are moved out of alignment with the first cage passageways 144 to prevent fluid flow through the first fluid passageway column 130. As an alternative, it is also conceivable that the stem 114 and cage 112 may additionally be configured such that when the stem 114 is in the fourth position, the first fluid passageway column 130 may be open simultaneously with the second and third fluid passageway columns 132, 133.

Figure 25:
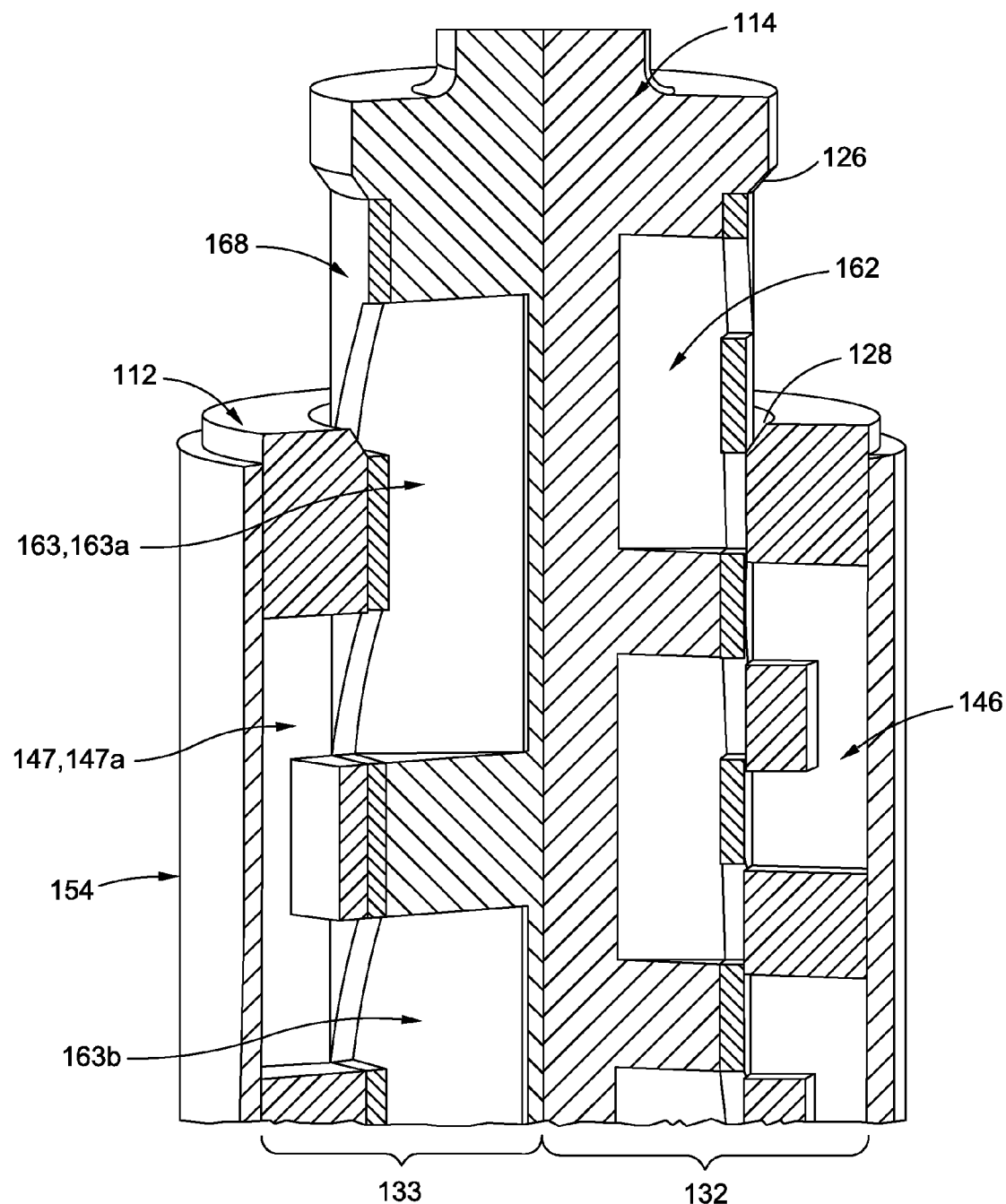
FIG. 25 is a partial perspective sectional view of the second embodiment of the trim, wherein the stem and stem sleeve are in a fifth position relative to the cage.

FIG. 25 shows the stem 114 in a fifth position, wherein the third fluid passageway column 133 is open, and the first and second fluid passageway columns 130, 132 are closed. With regard to the third fluid passageway column 133, the third stem and cage passageways 163, 147 are brought into substantially complete alignment with each other to place the third fluid passageway column 133 in a completely open configuration.

When the stem 114 is in the fifth position, the second stem and cage passageways 162, 146 are moved out of alignment with each other to close the second fluid passageway column 132 Likewise, the first stem and cage passageways 160, 144 are also brought out of alignment with each other to close the first fluid passageway column 130.

Figure 26:
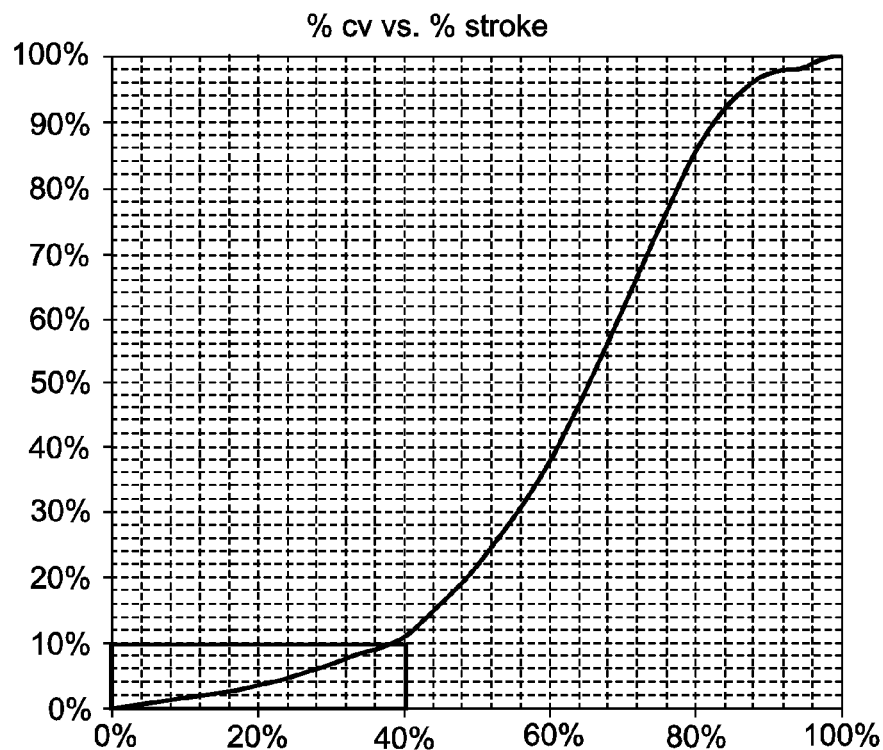
FIGS. 26 and 27 show performance of a control valve constructed in accordance with the basic principles of the present invention and having a second set of prescribed characteristics.
Figure 27:
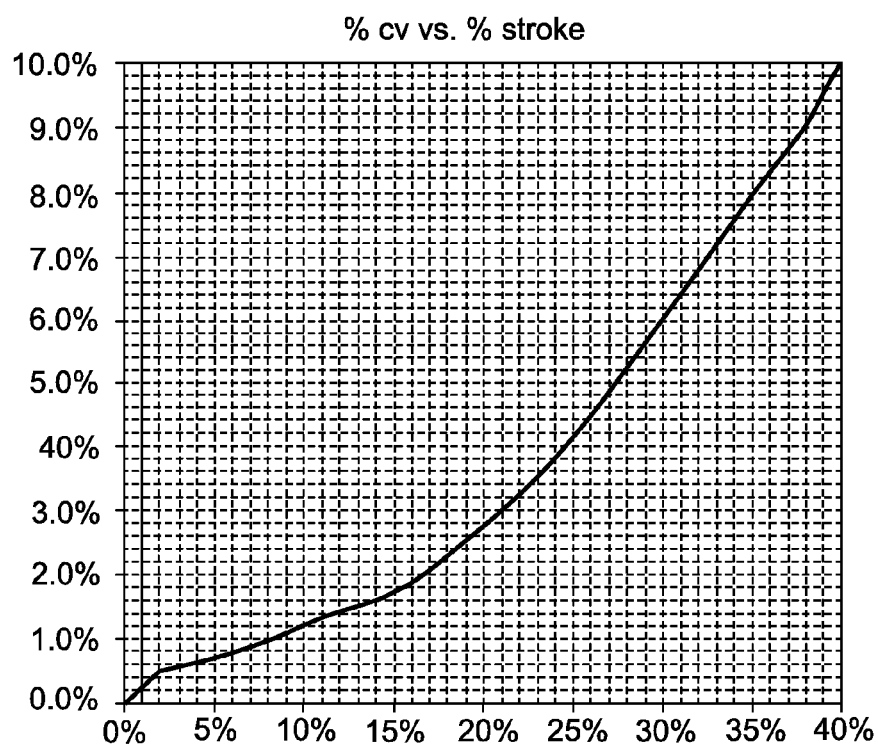

FIGS. 26 and 27 show testing results using a control valve which may comprise the trim 110 or a variant thereof as constructed in accordance with the basic principles of present invention, such control valve exhibiting the following characteristics:

Rated Cv—13.97
Rangeability—235:1
Leakage Flow Cv—0.059
Stroke—30 mm
Trim Height—240 mm
Plug/Stem Outer Diameter—50 mm
Trim Outer Diameter—86 mm
Max velocity with 200 bar pressure drop <40 m/s This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A cascade trim for a fluid control valve, the cascade trim comprising:
   a valve cage defining a valve inlet and a valve outlet; and
   a valve stem reciprocally moveable within the valve cage, the valve cage and valve stem collectively defining a first fluid passageway column and a second fluid passageway column, each of the first and second fluid passageway columns extending at least partially through the valve cage and the valve stem between the valve inlet and the valve outlet;
   the valve stem being moveable between:
      a closed position relative to the valve cage, wherein both the first and second fluid passageway columns are closed to prevent fluid from flowing between the valve inlet and valve outlet through the first and second fluid passageway columns;
      a first passageway position wherein the first fluid passageway column is open and the second fluid passageway column is closed to allow fluid to flow between the valve inlet and valve outlet through the first fluid passageway column; and
      a second passageway position wherein the second fluid passageway column is open and the first fluid passageway column is closed to allow fluid to flow between the valve inlet and valve outlet through the second fluid passageway column.

2. The cascade trim according to claim 1, wherein the valve stem is further moveable to an open position wherein the first fluid passageway column is open and the second fluid passageway column is open to allow fluid to flow between the valve inlet and the valve outlet through the first and second fluid passageway columns.

3. The cascade trim according to claim 1, wherein the first fluid passageway column is formed to exhibit flow characteristics that differ from the second fluid passageway column.

4. The cascade trim according to claim 1, wherein the valve cage includes a plurality of first cage passageways forming part of the first fluid passageway column and a plurality of second cage passageways forming part of the second fluid passageway column.

5. The cascade trim according to claim 4, wherein the plurality of first cage passageways are spaced from the plurality of second cage passageways.

6. The cascade trim according to claim 4, wherein:
the valve stem includes a plurality of first stem passageways forming part of the first fluid passageway column and a plurality of second stem passageways forming part of the second fluid passageway column;
the first cage passageways are aligned with the first stem passageways when the first fluid passageway column is open; and
the second cage passageways are aligned with the second stem passageways when the second fluid passageway column is open.

7. The cascade trim according to claim 6, wherein the plurality of first stem passageways are spaced from the plurality of second stem passageways.

8. The cascade trim according to claim 6, wherein each of the plurality of second stem passageways include an axial portion and an arcuate portion.

9. The cascade trim according to claim 1, wherein the valve cage and the valve stem are both formed through direct metal laser sintering.

10. The cascade trim according to claim 1, further comprising a sleeve disposable about the valve stem between the valve stem and the valve cage, the sleeve cooperating with the valve stem and valve cage to define the first fluid passageway column and the second fluid passageway column.

11. The cascade trim according to claim 1, wherein:
the first fluid passageway column is configured such that as fluid flows therethrough from the valve inlet to the valve outlet, the fluid makes a first number of transitions between the valve stem and the valve cage; and
the second fluid passageway column is configured such that as fluid flows therethrough from the valve inlet to the valve outlet, the fluid makes a second number of transitions between the valve stem and the valve cage;
the first number of transitions being different from the second number of transitions.

12. A cascade trim for a fluid control valve, the cascade trim comprising:
a valve cage defining a valve inlet and a valve outlet; and
a valve stem reciprocally moveable within the valve cage, the valve cage and valve stem each being configured to collectively define a first fluid passageway column and a second fluid passageway column, each of the first and second fluid passageway columns extending between the valve inlet and the valve outlet;
wherein reciprocal movement of the valve stem relative to the valve cage causes selective constitution and division of both the first fluid passageway column and the second fluid passageway column.

13. The cascade trim according to claim 12, wherein the valve stem is movable between:
a first column position wherein the first fluid passageway column is constituted to allow fluid to flow through the first fluid passageway column, and the second passageway column is divided into separate detached segments such that fluid cannot flow through the second fluid passageway column from the valve inlet to the valve outlet; and
a second column position wherein the second fluid passageway column is constituted to allow fluid to flow through the second fluid passageway column, and the first fluid passageway column is divided into separate detached segments such that fluid cannot flow through the first fluid passageway column from the valve inlet to the valve outlet.

14. The cascade trim according to claim 13, wherein the valve stem is further moveable to an open position wherein both the first and second fluid passageway columns are constituted to allow fluid to flow from the valve inlet to the valve outlet through both the first fluid passageway column and the second fluid passageway column.

15. The cascade trim according to claim 12, wherein the first fluid passageway column is formed to exhibit flow characteristics that differ from the second fluid passageway column.

16. The cascade trim according to claim 12, wherein the valve cage includes a plurality of first cage passageways forming part of the first fluid passageway column and a plurality of second cage passageways forming part of the second fluid passageway column.

17. The cascade trim according to claim 16, wherein the plurality of first cage passageways are spaced from the plurality of second cage passageways.

18. The cascade trim according to claim 16, wherein:
the valve stem includes a plurality of first stem passageways forming part of the first fluid passageway column and a plurality of second stem passageways forming part of the second fluid passageway column;
the first cage passageways are aligned with the first stem passageways when the first fluid passageway column is constituted; and
the second cage passageways are aligned with the second stem passageways when the second fluid passageway column is constituted.

19. The cascade trim according to claim 18, wherein the plurality of first stem passageways are spaced from the plurality of second stem passageways.

20. The cascade trim according to claim 13, wherein the valve cage and the valve stem are both formed through direct metal laser sintering.

* * * * *